US008188994B2

(12) United States Patent
Tada et al.

(10) Patent No.: US 8,188,994 B2
(45) Date of Patent: May 29, 2012

(54) POWER CONSUMPTION DETECTION APPARATUS, POWER CONSUMPTION CONTROL APPARATUS, IMAGE PROCESSING APPARATUS, SELF-LUMINOUS DISPLAY APPARATUS, ELECTRONIC DEVICE, POWER CONSUMPTION DETECTION METHOD, POWER CONSUMPTION CONTROL METHOD, AND COMPUTER PROGRAM

(75) Inventors: Mitsuru Tada, Kanagawa (JP); Atsushi Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1266 days.

(21) Appl. No.: 11/822,015

(22) Filed: Jun. 29, 2007

(65) Prior Publication Data

US 2008/0018640 A1 Jan. 24, 2008

(30) Foreign Application Priority Data

Jul. 18, 2006 (JP) ................................ 2006-195893

(51) Int. Cl.
*G09G 5/00* (2006.01)
*G06F 3/038* (2006.01)

(52) U.S. Cl. ........................................ 345/212; 345/211

(58) Field of Classification Search .................. 345/212, 345/211, 76–82

See application file for complete search history.

(56) References Cited

U.S. PATENT DOCUMENTS 7,239,308 B2 * 7/2007 Satoh et al. .................. 345/204
7,274,363 B2 * 9/2007 Ishizuka et al. ............... 345/211
2005/0237002 A1 * 10/2005 Nakamura ................. 315/169.3
2005/0264492 A1 * 12/2005 Knapp et al. .................... 345/76
2006/0022915 A1 * 2/2006 Weitbruch et al. .............. 345/77

FOREIGN PATENT DOCUMENTS

JP 2000-267628 A 9/2000
JP 2003-122305 A 4/2003
JP 2003-134418 5/2003
JP 2003-195816 A 7/2003
JP 2004-354762 12/2004
JP 2005-070426 A 3/2005
JP 2006-031020 A 2/2006
JP 2006-113212 A 4/2006
JP 2006-119465 A 5/2006
JP 2007-212644 A 8/2007
WO WO-2004/064030 A1 7/2004

OTHER PUBLICATIONS

English Translation of Japanese Office Action issued Nov. 22, 2011 for corresponding Japanese Application 2006-195893.

Japanese Office Action issued Feb. 7, 2012 for corresponding Japanese Application No. 2006-195893.

* cited by examiner

*Primary Examiner* — Alexander Eisen
*Assistant Examiner* — Kenneth B Lee, Jr.
(74) *Attorney, Agent, or Firm* — Rader, Fishman & Grauer, PLLC

(57) ABSTRACT

Disclosed herein is a power consumption detection apparatus including: a line current calculation section configured to calculate, based on an image signal, a value of a line current consumed by each of horizontal lines; and a power consumption calculation section configured to calculate, on a horizontal line cycle, power consumed by an entire display panel based on the most recent values of the line currents, the values corresponding in number to a vertical resolution.

8 Claims, 35 Drawing Sheets

HORIZONTAL SYNCHRONIZATION PULSE

DUTY PULSE (STANDARD)

LIGHT-OFF TIMING SIGNAL

DUTY PULSE (AFTER REDUCTION)

POWER CONSUMPTION DETECTION APPARATUS, POWER CONSUMPTION CONTROL APPARATUS, IMAGE PROCESSING APPARATUS, SELF-LUMINOUS DISPLAY APPARATUS, ELECTRONIC DEVICE, POWER CONSUMPTION DETECTION METHOD, POWER CONSUMPTION CONTROL METHOD, AND COMPUTER PROGRAM

CROSS REFERENCES TO RELATED APPLICATIONS

The present invention contains subject matter related to Japanese Patent Application JP 2006-195893, filed in the Japan Patent Office on Jul. 18, 2006, the entire contents of which being incorporated herein by reference.

BACKGROUND OF THE INVENTION

1. Field of the Invention

The present invention relates to technologies of detection and optimization of power consumption of a self-luminous display apparatus.

Embodiments of the present invention proposed by the present inventors include a power consumption detection apparatus, a power consumption control apparatus, an image processing apparatus, a self-luminous display apparatus, an electronic device, a power consumption detection method, a power consumption control method, and a computer program.

2. Description of the Related Art

One common problem of all display apparatuses is to reduce power consumption of a display device. The reduction in power consumption of the display device is very important for reducing power consumption of the entire display apparatus.

However, the power consumption of a self-luminous display apparatus constantly changes depending on the contents of a display image. Therefore, a technique for detecting the power consumption is important for controlling the power consumption to fall within an allowable power range. Examples of known techniques for detecting the power consumption include those disclosed in Japanese Patent Laid-Open No. 2004-354762 (hereinafter referred to as Patent Document 1) and Japanese Patent Laid-Open No. 2003-134418 (hereinafter referred to as Patent Document 2).

Patent Document 1 discloses a system for estimating power consumed by an entire screen using frame memory.

Patent Document 2 discloses a technique of calculating an average brightness level of each frame based on an image signal, and limiting the brightness of a display panel driven by pulse width modulation based on the average brightness level.

SUMMARY OF THE INVENTION

In the known techniques as described above, the power consumption is estimated on a frame-by-frame basis. That is, the average power consumption only of each frame can be detected. Thus, it may be impossible to detect fluctuation of the power consumption within each frame period in real time.

As such, the present inventors propose a technique that enables real-time detection of the power consumption of a self-luminous display apparatus (i.e., a display panel).

Specifically, according to one embodiment of the present invention, there is provided a power consumption detection apparatus including: (a) a line current calculation section configured to calculate, based on an image signal, a value of a line current consumed by each of horizontal lines; and (b) a power consumption calculation section configured to calculate, on a horizontal line cycle, power consumed by an entire display panel based on the most recent values of the line currents, the values corresponding in number to a vertical resolution.

In addition, the present inventors propose a technique for controlling the power consumption in real time using the above detection capability.

Specifically, according to another embodiment of the present invention, there is provided a power consumption control apparatus including: (a) a line current calculation section configured to calculate, based on an image signal, a value of a line current consumed by each of horizontal lines; (b) a power consumption calculation section configured to calculate, on a horizontal line cycle, power consumed by an entire display panel based on the most recent values of the line currents, the values corresponding in number to a vertical resolution; and (c) a power consumption control section configured to control, on the horizontal line cycle, peak brightness of a display screen so that the consumed power calculated on the horizontal line cycle satisfies allowable power consumption.

Use of the above detection technique proposed by the present inventors makes it possible to detect the power consumption at intervals of one frame period divided by the vertical resolution. As a result, precision of the detection of the power consumption is improved compared to related art.

In addition, use of the above control technique proposed by the present inventors makes it possible to control the power consumption at intervals of one frame period divided by the vertical resolution. As a result, precision of the control of the power consumption is improved compared to related art.

DETAILED DESCRIPTION OF THE PREFERRED EMBODIMENTS

Hereinafter, a technique for detecting power consumption and a technique for controlling the power consumption according to embodiments of the present invention will be described.

Note that where no particular illustration or description is provided in the present specification, techniques known in the art are applied.

Also note that exemplary embodiments described below are each simply one exemplary embodiment of the present invention, and should not be interpreted as restricting the present invention.

(A) Technique for Detecting Power Consumption (A-1) Structure of Self-Luminous Display Panel In this exemplary embodiment, use of an organic 1L display panel having a matrix pixel structure is assumed. That is, use of a self-luminous display panel in which organic EL elements are arranged at intersections of Y electrodes (i.e., data lines) and X electrodes (i.e., gate lines) on a glass substrate is assumed. Note that the organic EL panel in this exemplary embodiment is for color display. Therefore, one pixel in terms of display is composed of subpixels that correspond to RGB color components.

As a drive system of the organic 1L display panel, a line-sequential scanning system is adopted. That is, a drive system is adopted in which illumination of pixels is controlled on a horizontal line by horizontal line basis.

In this exemplary embodiment, an organic EL panel having a capacitor provided in a pixel circuit corresponding to each organic EL element is used.

Therefore, in this organic EL display panel, gradation information (i.e., a voltage value) written to and stored in the capacitor is retained therein until the next writing time. Thus, the organic EL display panel is illuminated in a mode similar to that of a frame-sequential scanning system. That is, while the writing of the gradation information (i.e., the voltage value) is performed on a horizontal line by horizontal line basis, the illumination of each pixel based on the written gradation information (i.e., the voltage value) is allowed to continue for one frame period from the writing time of the gradation information.

(A-2) Structure of Power Consumption Detection Apparatus

Figure 1:
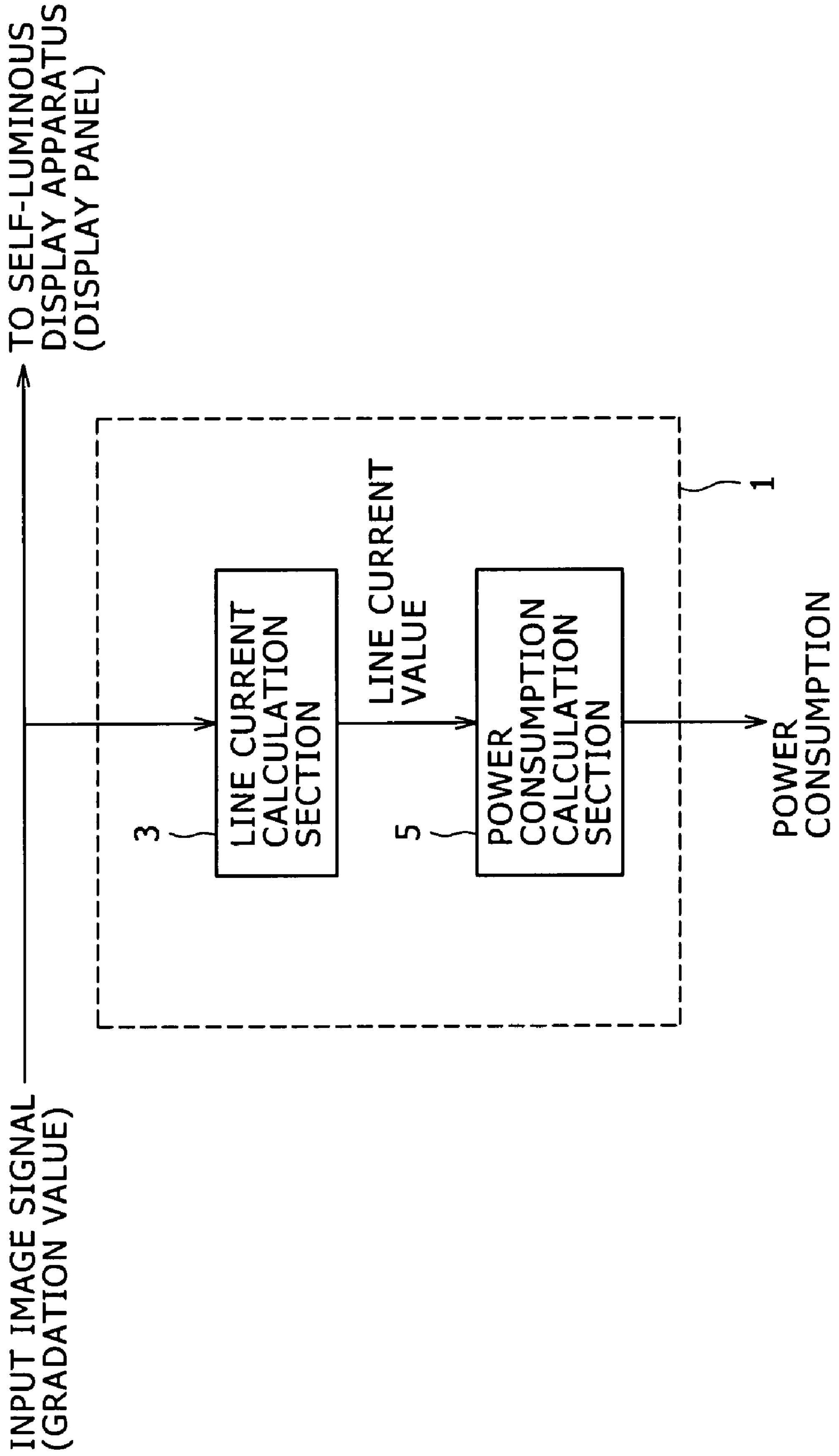
FIG. 1 shows an exemplary functional structure of a power consumption detection apparatus.

FIG. 1 shows an exemplary functional structure of a power consumption detection apparatus 1 proposed by the inventors. The power consumption detection apparatus 1 includes two functional blocks: a line current calculation section 3 and a power consumption calculation section 5.

The line current calculation section 3 is a processing device for calculating a value of a line current consumed by each horizontal line based on an image signal. The power consumption calculation section 5 is a processing device for calculating, on a horizontal line cycle, power consumed by the entire display panel based on the most recent line current values which correspond in number to a vertical resolution.

(a) Line Current Calculation Section

Figure 2:
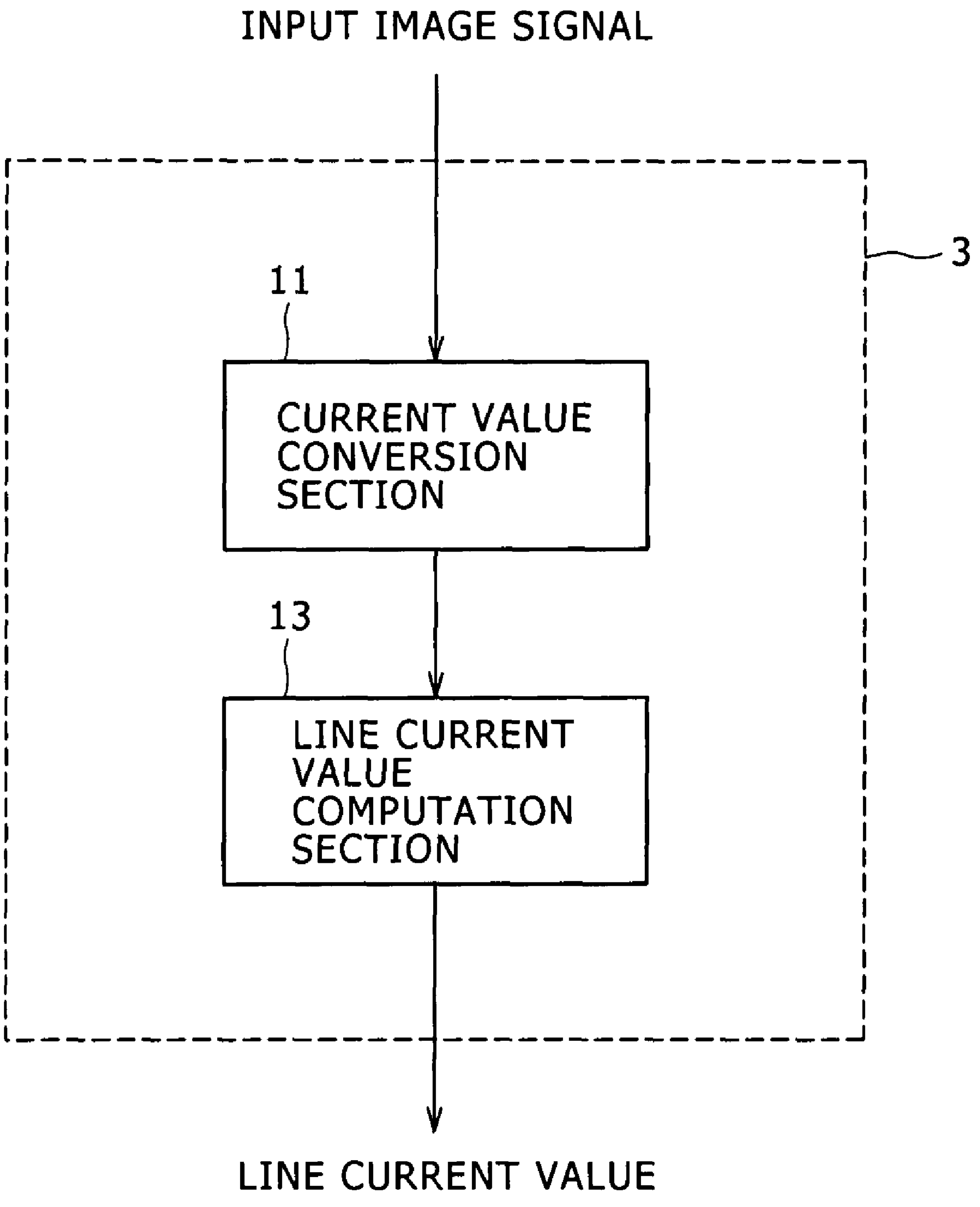
FIG. 2 is an exemplary functional block diagram of a line current calculation section.

FIG. 2 is a functional block diagram of the line current calculation section 3. The line current calculation section 3 in this exemplary embodiment includes two functional blocks: a current value conversion section 11 and a line current value computation section 13.

The current value conversion section 11 is a processing device for converting an input image signal (i.e., a gradation value) corresponding to each pixel into a current value $i_n$ (where $1 \leqq n \leqq$ horizontal resolution). In this exemplary embodiment, the current value conversion section 11 converts the gradation value corresponding to each pixel into a current value by using a conversion table that stores correspondence between the gradation value and the value of current (i.e., the current value) that flows in the organic EL element.

Figure 3:
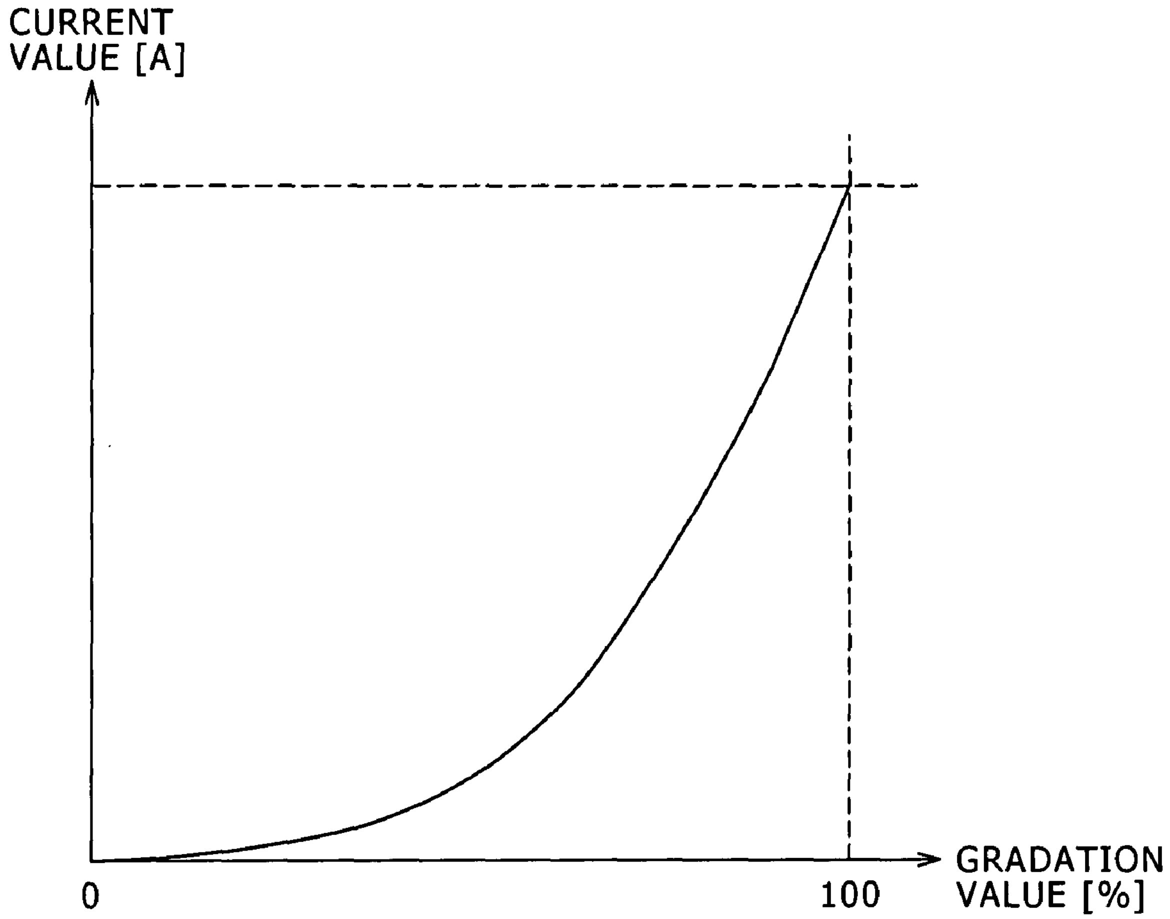
FIG. 3 shows exemplary correspondence between gradation values and current values.

FIG. 3 shows exemplary correspondence between the gradation value and the current value. As is apparent from FIG. 3, the gradation value and the current value generally have a nonlinear relationship. This correspondence therebetween is obtained by a prior experiment. In this exemplary embodiment, this correspondence is stored in the conversion table.

The line current value computation section 13 is a processing device for summing the current values $i_n$ that correspond in number to a horizontal resolution to obtain a line current value $I$ ($=\Sigma i_n$) (where n is from 1 to the number of pixels in one horizontal line (i.e., the horizontal resolution)). The line current value I is the value of current consumed by each horizontal line.

The line current value computation section 13 operates in synchronism with horizontal synchronization pulses, and identifies boundaries of the horizontal lines. Each time the sum total of the current values of all pixels that constitute the horizontal line is calculated, the line current value computation section 13 outputs the sum total calculated to the power consumption calculation section 5 as the line current value.

Figure 4:
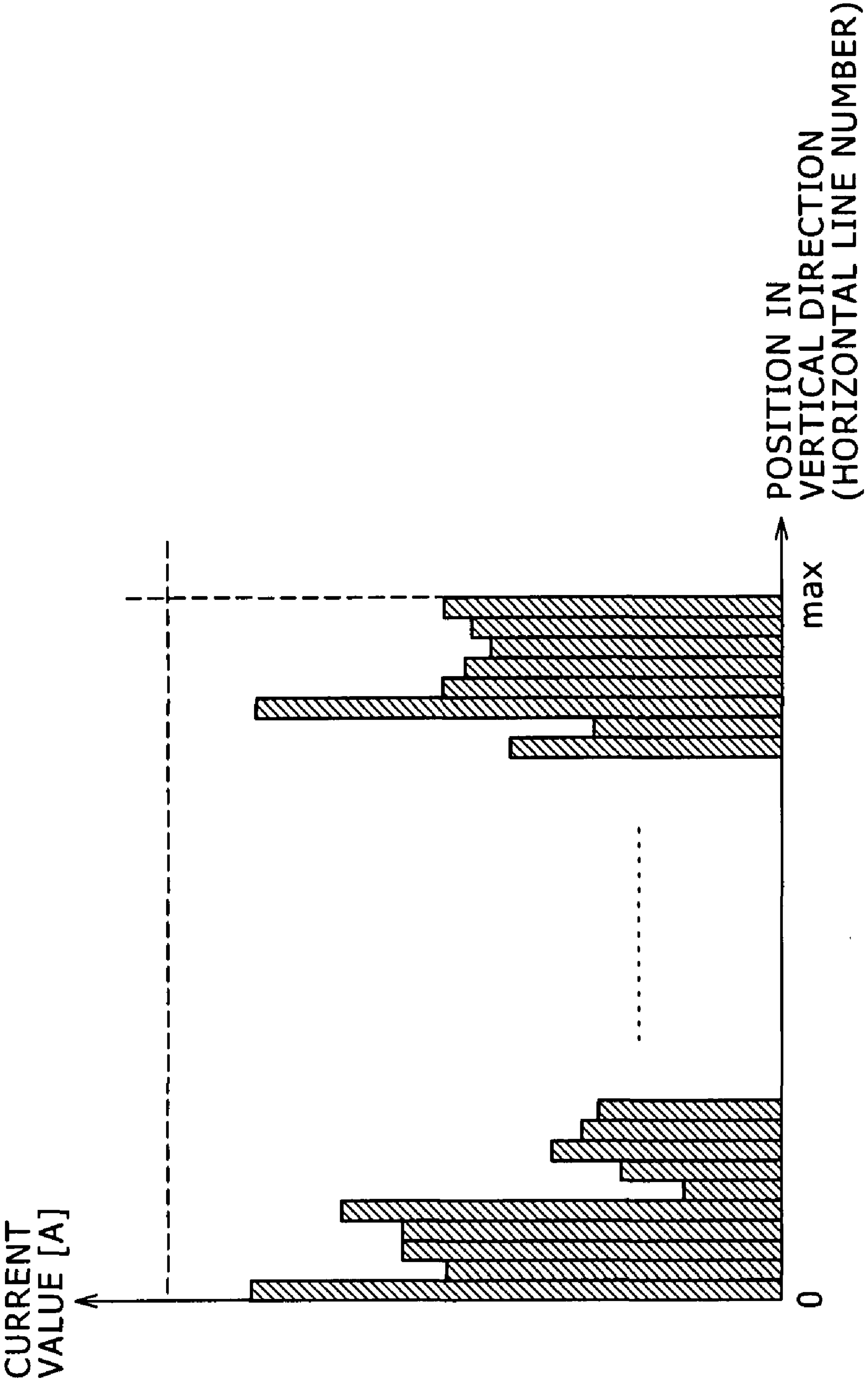
FIG. 4 shows an image of line current values calculated.

FIG. 4 shows an image of the line current values calculated. A vertical axis represents the current value, while a horizontal axis represents positions of the horizontal lines (i.e., horizontal line numbers).

In FIG. 4, the length of each bar graph represents the line current value of the corresponding horizontal line.

Therefore, FIG. 4 shows variations in the current value in accordance with the position of the horizontal lines that constitute one frame. As shown in FIG. 4, in a common display image, the line current value varies widely in accordance with the position of the horizontal lines.

The line current value takes the minimum value (0) when all pixels on the horizontal line are black (not illuminated). The line current value takes the maximum value when all pixels on the horizontal line are illuminated with 100% brightness. The pixels commonly take a brightness value between these two extremes.

(b) Power Consumption Calculation Section

Figure 5:
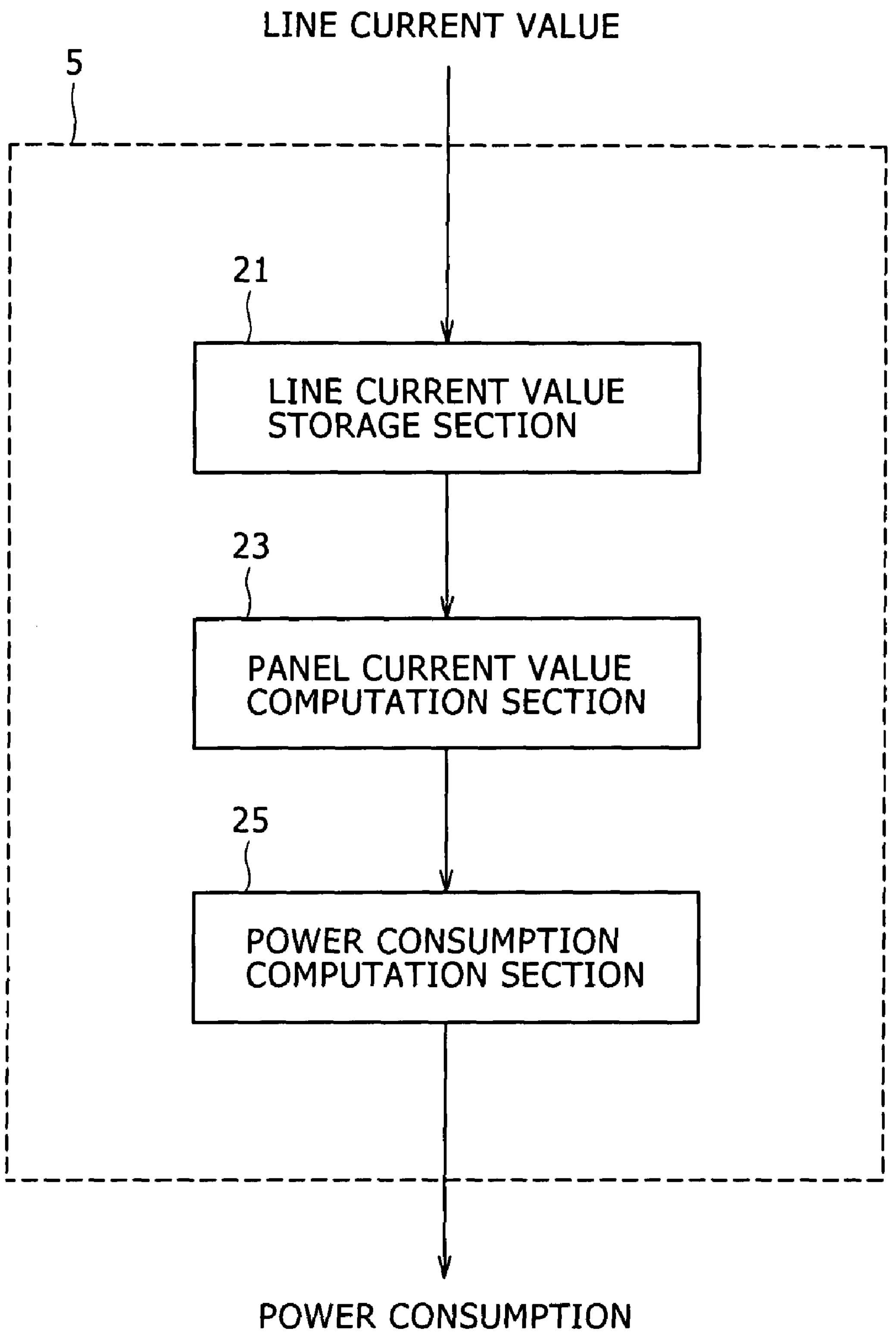
FIG. 5 is an exemplary functional block diagram of a power consumption calculation section.

FIG. 5 is a functional block diagram of the power consumption calculation section 5. The power consumption calculation section 5 in this exemplary embodiment includes three functional blocks: a line current value storage section 21, a panel current value computation section 23, and a power consumption computation section 25.

The line current value storage section 21 is a processing device for storing the most recent line current values I, supplied from the line current value computation section 13, that correspond in number to the vertical resolution. That is, regardless of a frame being displayed, the line current value storage section 21 stores the line current values I inputted in the most recent one frame period. Thus, in the line current value storage section 21, the line current value I that has been recorded the earliest is overwritten by the most recent line current value.

The panel current value computation section 23 is a processing device for summing the line current values I that correspond in number to the vertical resolution to obtain a panel current value $I_{panel}$ (=$\Sigma I_m$) (where 1≦m≦vertical resolution). The panel current value $I_{panel}$ is the value of current consumed by the entire display panel. Here, the panel current value $I_{panel}$ means the amount of current consumed by the entire panel when a certain horizontal line has been updated. A reason for use of the above calculation formula is that combined images that are updated on a horizontal line by horizontal line basis, one horizontal line after another, are illuminated concurrently for display.

Figures 6A, 6B, 6C, 6D:
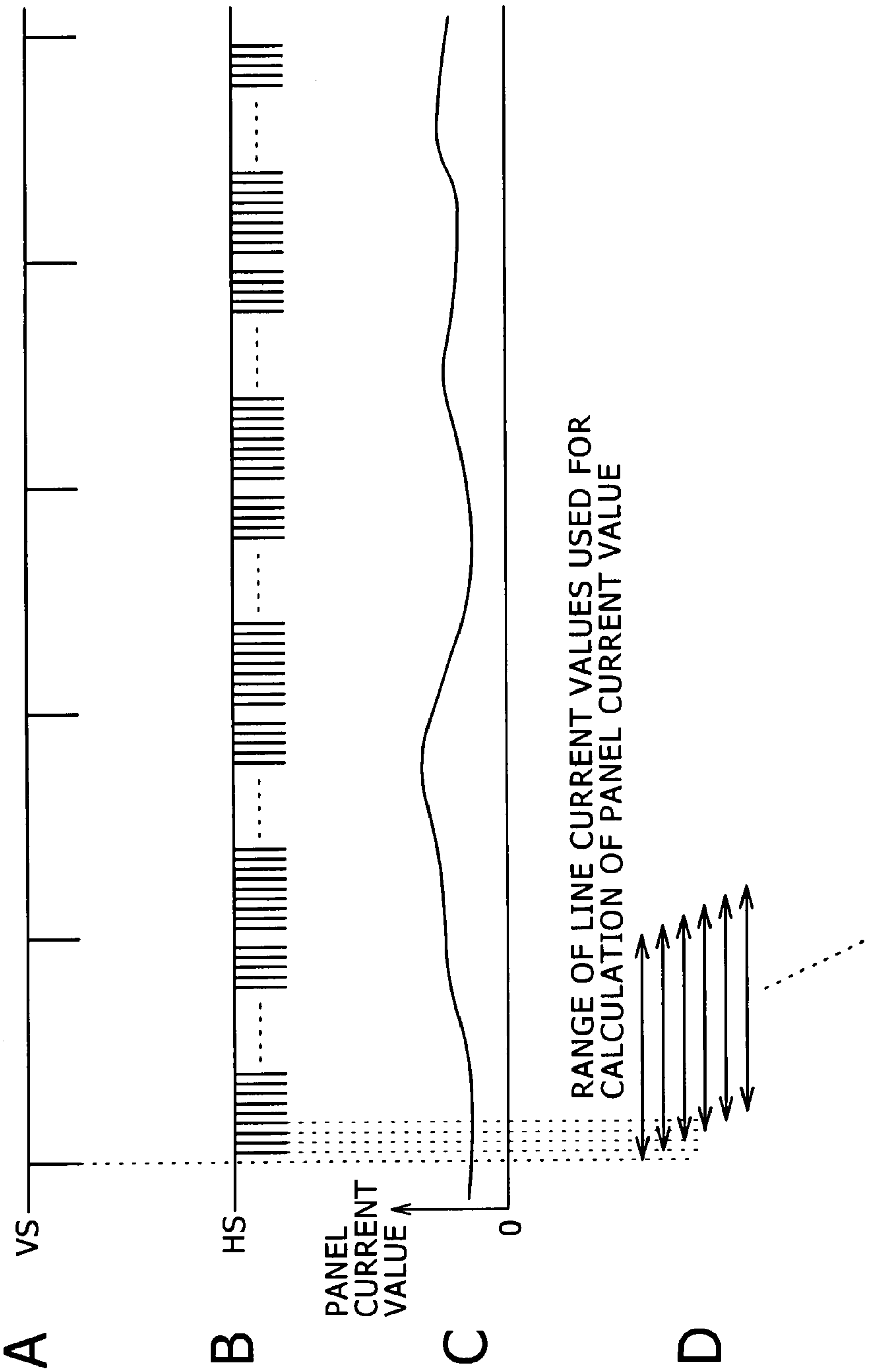
FIGS. 6A to 6D show relationships between variation of a panel current value over time and ranges of line current values that are used for calculation of the panel current value.

FIGS. 6A to 6D show relationships between variation of the panel current value $I_{panel}$ over time and ranges of line current values that are used for calculation of the panel current value $I_{panel}$. FIG. 6A shows vertical synchronization pulses VS. A pulse period thereof corresponds to one frame period. FIG. 6B shows horizontal synchronization pulses HS. In synchronism with a pulse period thereof, the image signals of the corresponding horizontal line are inputted, and the line current value of each horizontal line is calculated. FIG. 6C shows the variation of the panel current value over time. FIG. 6D shows the ranges of the line current values used for the calculation of the panel current values.

As shown in FIG. 6D, the range of the line current values used for the calculation of the panel current value is shifted sequentially by one horizontal line in synchronism with the horizontal synchronization pulses HS. This shifting is executed each time any of horizontal line images that constitute a display screen is updated. As a result, a difference in the line current values resulting from replacement of the horizontal lines appears as a variation in the panel current value $I_{panel}$ over time.

The power consumption computation section 25 is a processing device for calculating, on the horizontal line cycle, power consumption W (=$I_{panel}$×Vcc) of the entire display panel by multiplying the panel current value $I_{panel}$ by a power supply voltage value Vcc of the display panel. In the case of a common system, the power supply voltage value Vcc is fixed. Note that in the case where the power supply voltage value Vcc is regulated for peak brightness control or the like, the power supply voltage value Vcc at the time of calculation is used for the calculation of the power consumption.

Figures 7A, 7B, 7C, 7D:
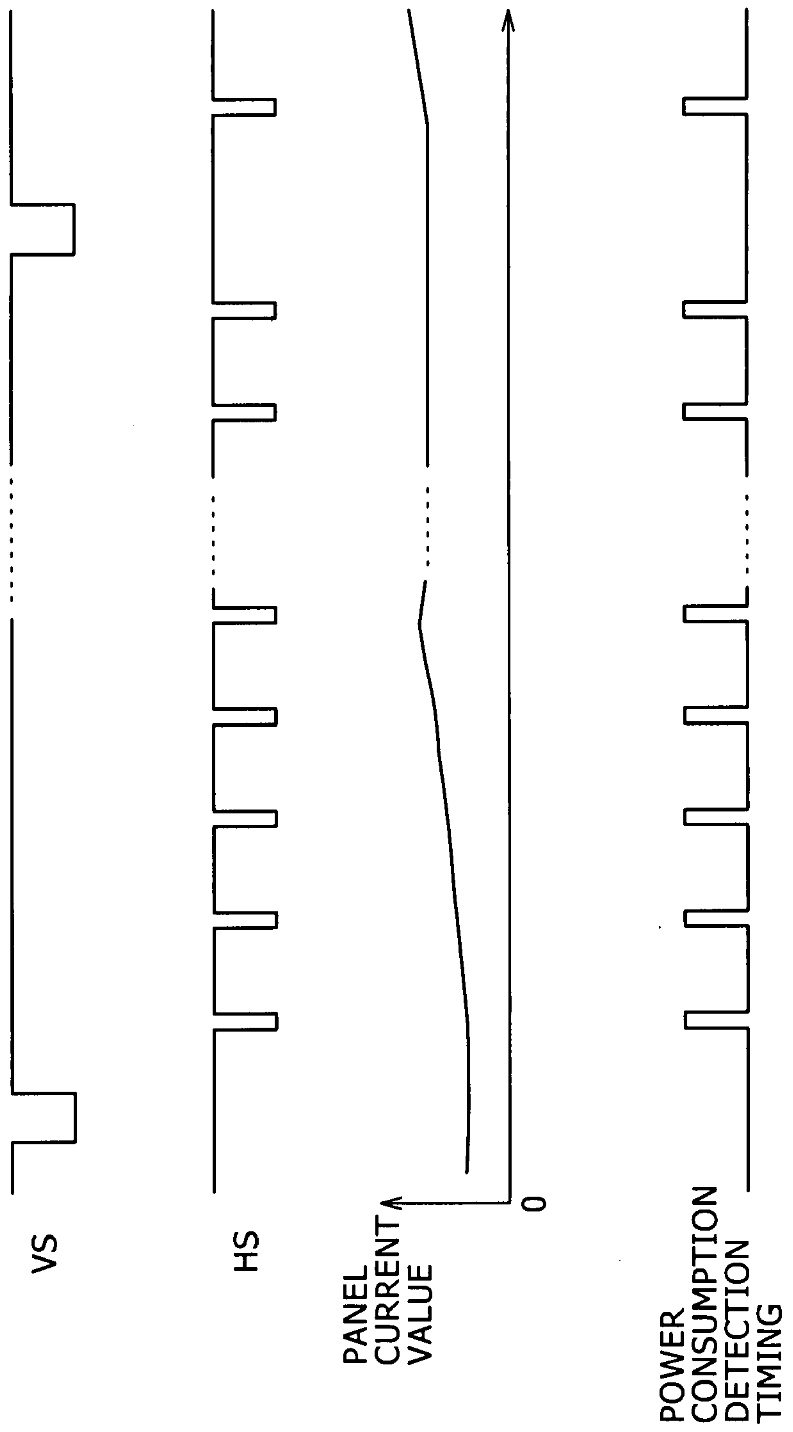
FIGS. 7A to 7D show timing of detection of the power consumption of an entire display panel.

FIGS. 7A to 7D show timing of detection of the power consumption of the entire display panel. FIG. 7A shows input timing of the vertical synchronization pulses VS. FIG. 7B shows input timing of the horizontal synchronization pulses HS. FIG. 7C shows the variation of the panel current value over time. FIG. 7D shows timing of detection of the power consumption W. As shown in FIG. 7D, the power consumption W of the entire display panel is detected in synchronism with the horizontal synchronization pulses HS.

Note that in related art, the power consumption of the entire display panel is detected in synchronism with the vertical synchronization pulses VS. Therefore, in this exemplary embodiment, the interval of the detection of the power consumption is reduced by a factor of 1/(vertical resolution) compared to related art. As described above, in this exemplary embodiment, it is possible to detect the power consumption W of the entire display panel with timing synchronized with a horizontal synchronization pulse cycle, which is an update cycle of the display image.

(A-3) Operation and Effect of Detection of Power Consumption

An operation of detection of the power consumption executed by the power consumption detection apparatus 1 having the above-described functional structure will now be described below in terms of a procedure.

Figure 8:
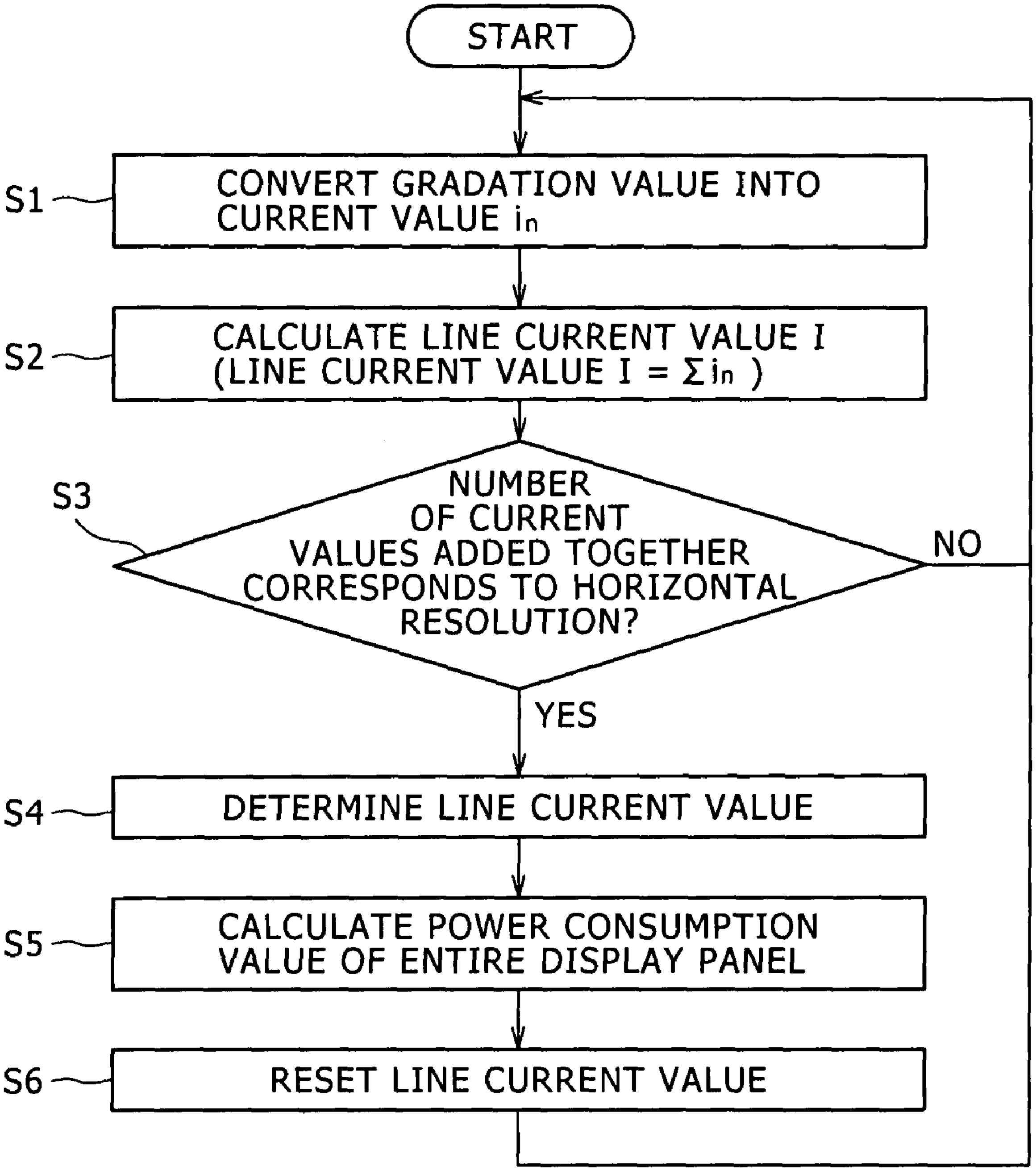
FIG. 8 shows an exemplary procedure for detecting the power consumption.

FIG. 8 shows a flowchart illustrating the procedure. A series of processes described below is executed in a period in which the horizontal lines are processed.

The power consumption detection apparatus 1 converts the input image signal (i.e., the gradation value) into the current value $i_n$ (S1). The input image signals are inputted sequentially. Next, the power consumption detection apparatus 1 adds the current value $i_n$ obtained by the above conversion process to the line current value I (S2). When the line current value I has been updated, the power consumption detection apparatus 1 determines whether the number of current values $i_n$, added together corresponds to the horizontal resolution (S3). That is, the power consumption detection apparatus 1 determines whether a parameter n of the current value $i_n$ has reached the number corresponding to the vertical resolution.

If the result of the determination at step S3 is negative, which means that the addition of all current components on the same horizontal line has not been completed yet, the power consumption detection apparatus 1 returns to the conversion process of step S1.

Meanwhile, if the result of the determination at step S3 is affirmative, the power consumption detection apparatus 1 determines that the calculation of the line current value I with respect to the currently-inputted (i.e., currently-updated) horizontal line has been completed. At this point, the power consumption detection apparatus 1 determines the line current value I as calculated (S4).

Thereafter, the power consumption detection apparatus 1 uses the determined line current value I to calculate the power consumption value of the entire display panel (S5).

Next, the power consumption detection apparatus 1 resets the line current value I (S6), and returns to the conversion process of step S1 again.

The above processing operation is repeated continuously. Thus, it is made possible to detect the power consumption value of the entire display panel on the horizontal line cycle. In addition, since this detection cycle coincides with the update cycle of the horizontal lines, it is possible to detect the variation of the power consumption nearly in real time.

In this exemplary embodiment, a storage size necessary for the calculation of the power consumption need be no more than a capacity sufficient for storing the current values (obtained by the above conversion) that correspond in number to the horizontal resolution, in addition to a capacity sufficient for storing the line current values that correspond in number to the vertical resolution. This value of capacity is significantly low compared to a storage capacity necessary for storing the input image signals (i.e., the gradation values) corresponding to one frame.

Thus, a reduction in a circuit scale of the power consumption detection apparatus is achieved. When the power consumption detection apparatus is mounted in an organic EL display apparatus or other electronic devices, it is possible to mount the power consumption detection apparatus on a part of an existing semiconductor integrated circuit because of the reduced circuit scale. This may eliminate the need to prepare new space or external wire for the power consumption detection apparatus to be mounted in the organic EL display apparatus or other electronic devices.

(B) Exemplary Application Devices

Here, exemplary application devices that use the above-described power consumption detection apparatus 1 will be described. Hereinafter, a peak brightness control apparatus for controlling peak brightness of the organic EL display panel by using the power consumption value detected in real time will be described. This peak brightness control apparatus corresponds to a "power consumption control apparatus" in the appended claims.

(B-1) Exemplary Basic Structure

Figure 9:
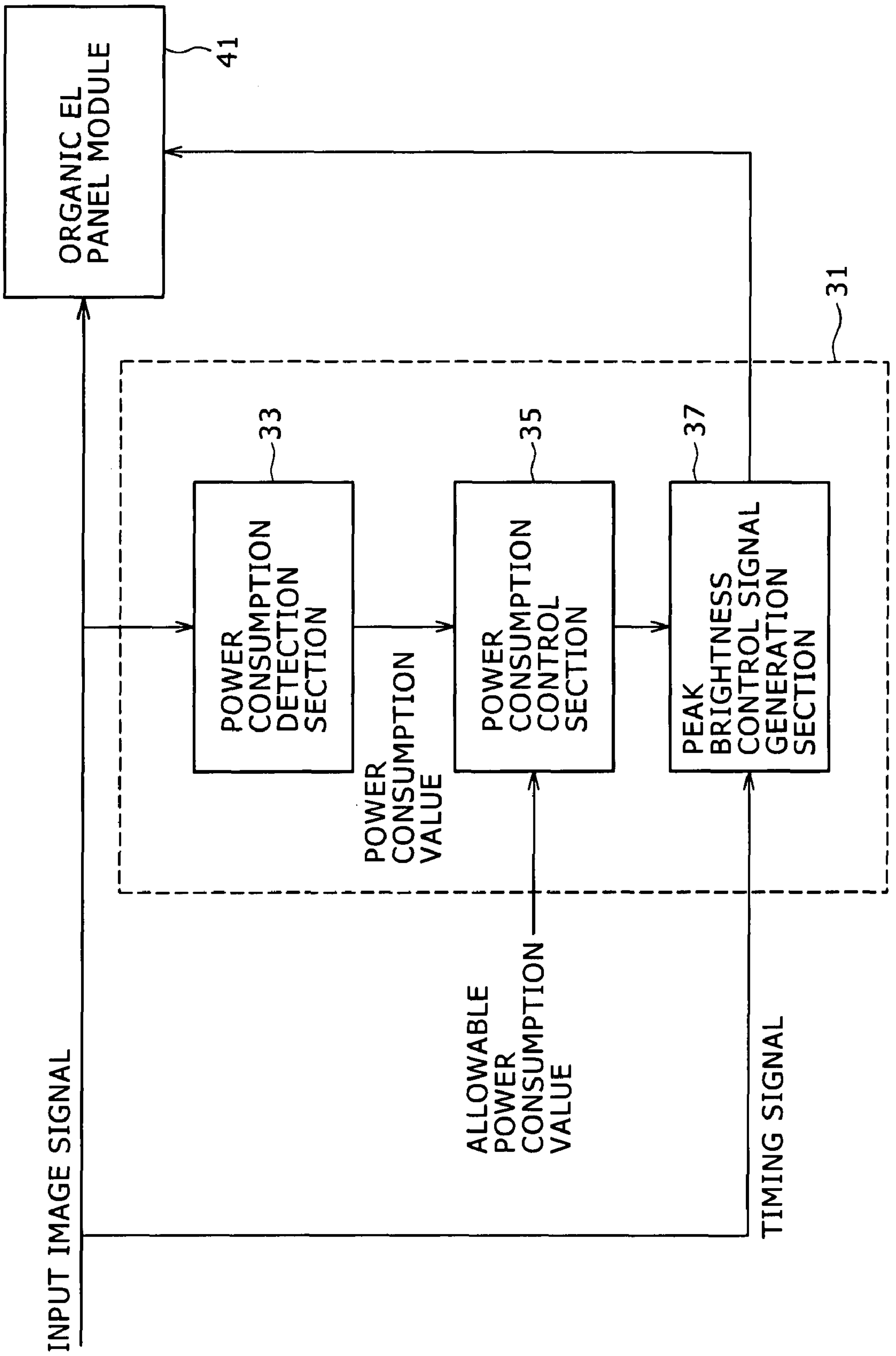
FIG. 9 shows an exemplary functional structure of a peak brightness control apparatus.

FIG. 9 shows an exemplary basic structure of a peak brightness control apparatus 31 according to this exemplary embodiment. The peak brightness control apparatus 31 includes three functional blocks: a power consumption detection section 33, a power consumption control section 35, and a peak brightness control signal generation section 37.

The power consumption detection section 33 corresponds to the above-described power consumption detection apparatus 1. As described above, the power consumption detection section 33 outputs the power consumption owing to the illumination of an organic EL panel module 41 on the horizontal synchronization pulse cycle.

The power consumption control section 35 is a processing device for comparing the power consumption value (i.e., a predicted value) calculated in real time with an allowable power consumption value, which has been set beforehand, to output a control signal for the power consumption so that the predicted value will not exceed the allowable power consumption value.

Figure 10:
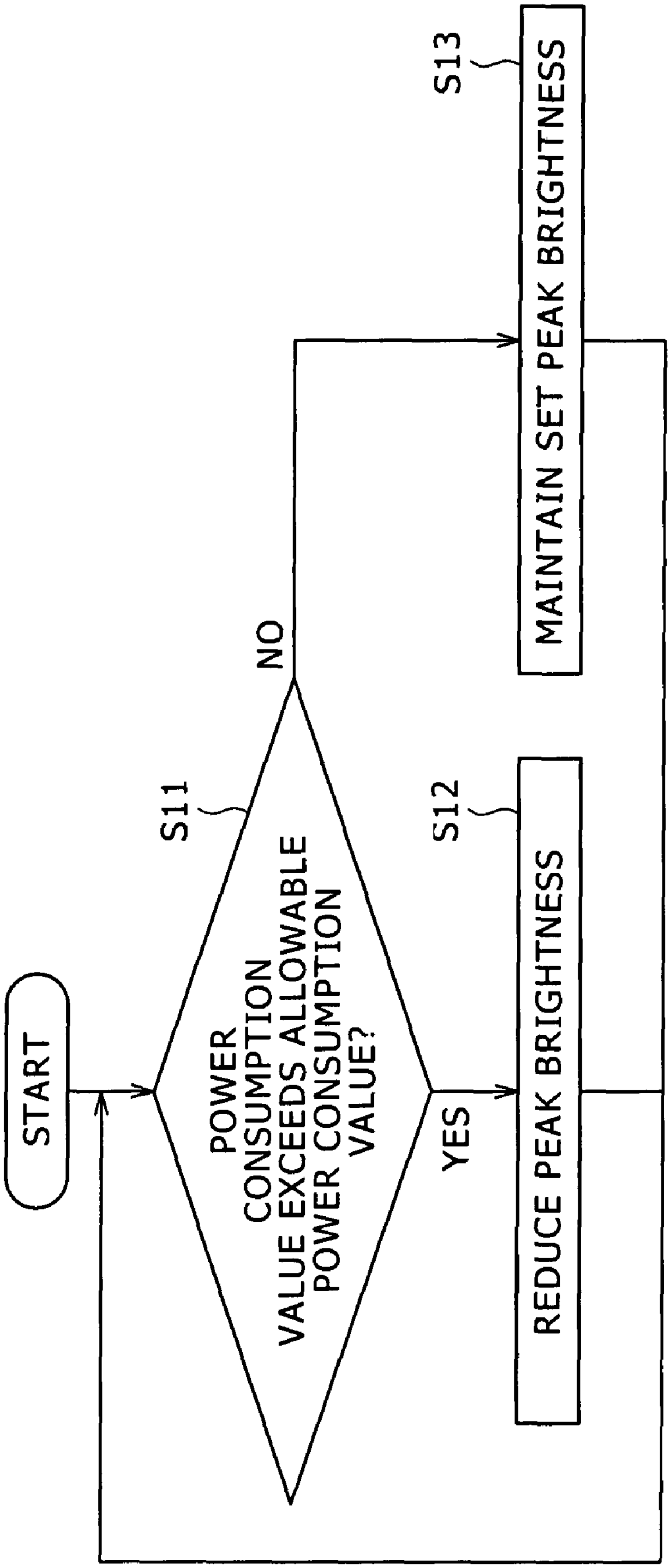
FIG. 10 shows an exemplary procedure executed by a power consumption control section.

FIG. 10 shows a basic processing operation executed by the power consumption control section 35. When a power consumption value W that is consumed in the next horizontal synchronization period is provided, the power consumption control section 35 determines whether the power consumption value W exceeds the allowable power consumption value (S11).

If the result of the determination at step S11 is affirmative (i.e., if the power consumption value W exceeds the allowable power consumption value), the power consumption control section 35 outputs the control signal so as to reduce the peak brightness of the display screen (S12). Meanwhile, if the result of the determination at step S11 is negative (i.e., if the power consumption value W does not exceed the allowable power consumption value), the power consumption control section 35 outputs the control signal so as to maintain the peak brightness of the display screen at a set value (S13). The above operation is repeated each time any horizontal line is processed.

The peak brightness control signal generation section 37 is a processing device for generating a peak brightness control signal for the organic EL panel module 41 based on the control signal for the power consumption. Update of this peak brightness control signal is naturally executed with timing synchronized with the horizontal synchronization pulses HS. FIGS. 11A to 11D show update timing of the peak brightness control signal.

Figures 11A, 11B, 11C, 11D:
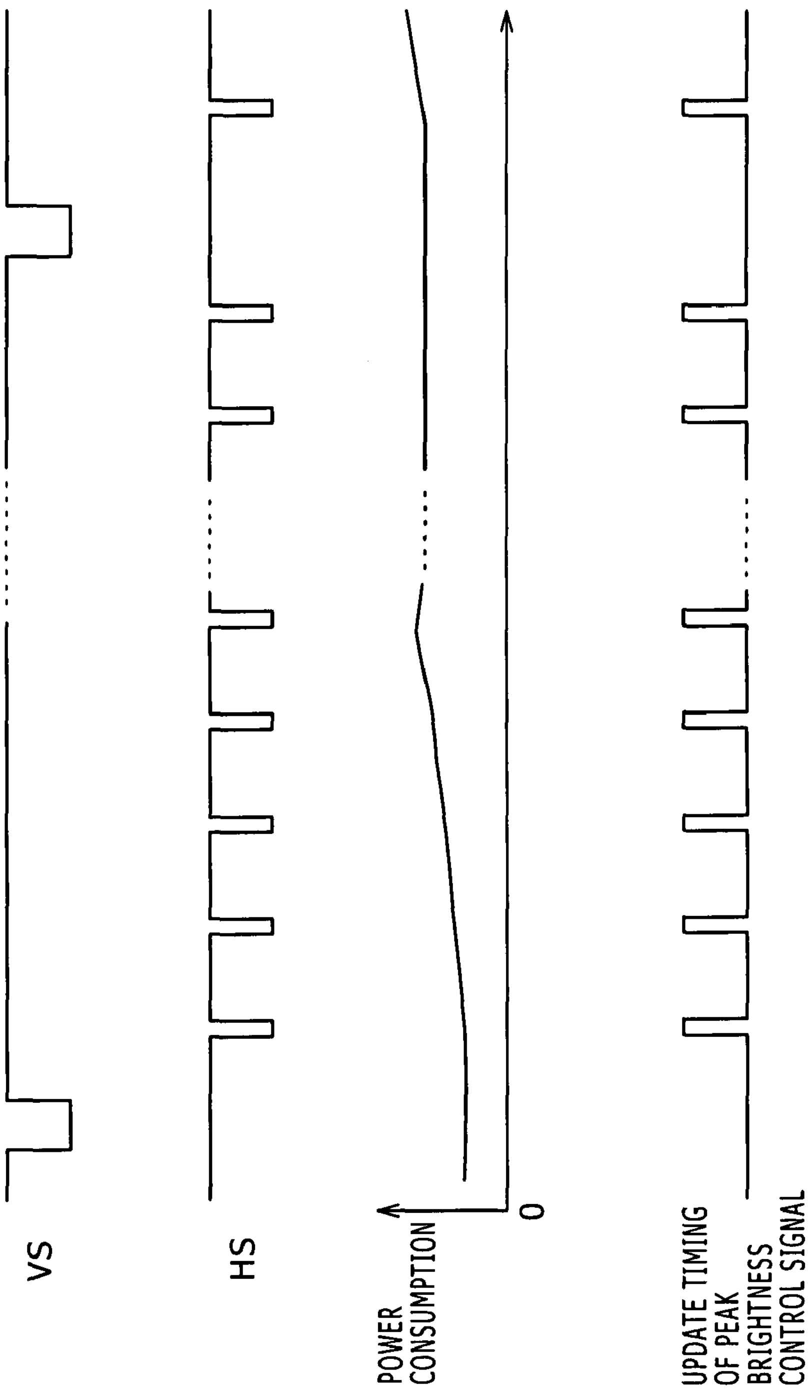
FIGS. 11A to 11D show update timing of a peak brightness control signal.

FIG. 11A shows the input timing of the vertical synchronization pulses VS. FIG. 11B shows the input timing of the horizontal synchronization pulses HS. FIG. 11C shows the variation of the power consumed by the entire display panel over time. FIG. 11D shows the update timing of the peak brightness control signal.

As described above, use of the results of the detection by the power consumption detection section 33 makes it possible to control the peak brightness of the organic EL panel on the horizontal line cycle. As a result, it becomes possible to control the variation of the power consumption in accordance with display of display images so that the power consumption satisfies the range of the allowable power consumption value.

(B-2) Exemplary Application 1 (Duty Pulse Type)

Here, a method for controlling the peak brightness of the organic EL display panel via switching control of a duty pulse width will be described.

Figures 12A, 12B:
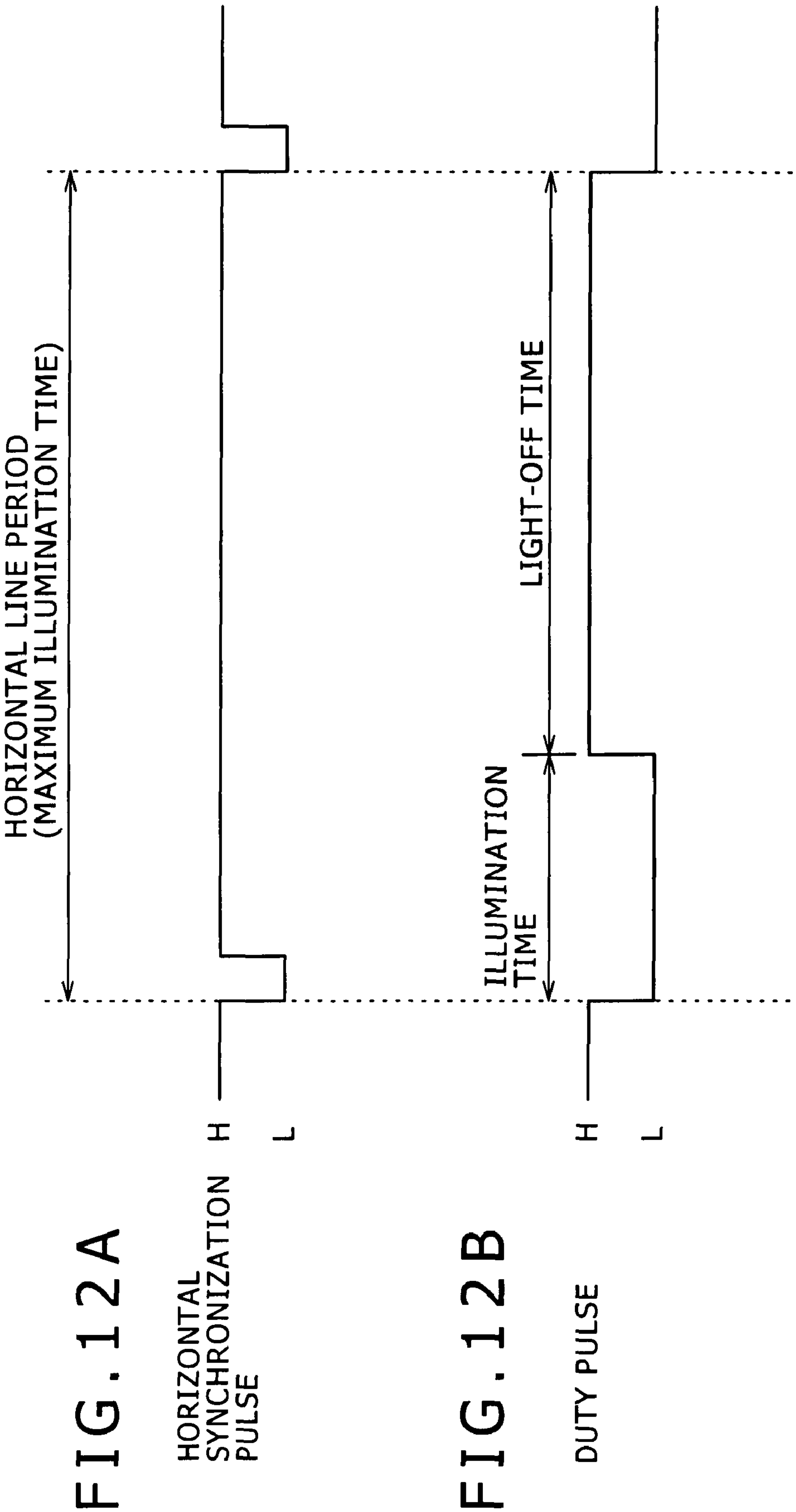
FIGS. 12A and 12B are diagrams for explaining a duty pulse.

Referring to FIGS. 12A and 12B, the duty pulse is a signal for defining an illumination time (see FIG. 12B) of the organic EL element within one horizontal line period (see FIG. 12A). In FIG. 12B, an L-level length of the duty pulse corresponds to the length of the illumination time of the organic EL element.

The gradation value being the same, the longer the illumination time is, the higher the peak brightness becomes, and the shorter the illumination time is, the lower the peak brightness becomes.

This exemplary application will be described with reference to a case where the duty pulse width is switched between two values. That is, the duty pulse is switched between two types of duty pulses: a duty pulse having a relatively longer pulse width (i.e., a longer length of the illumination time) and a duty pulse having a relatively shorter pulse width (i.e., a shorter length of the illumination time).

(a) Apparatus Structure

Figure 13:
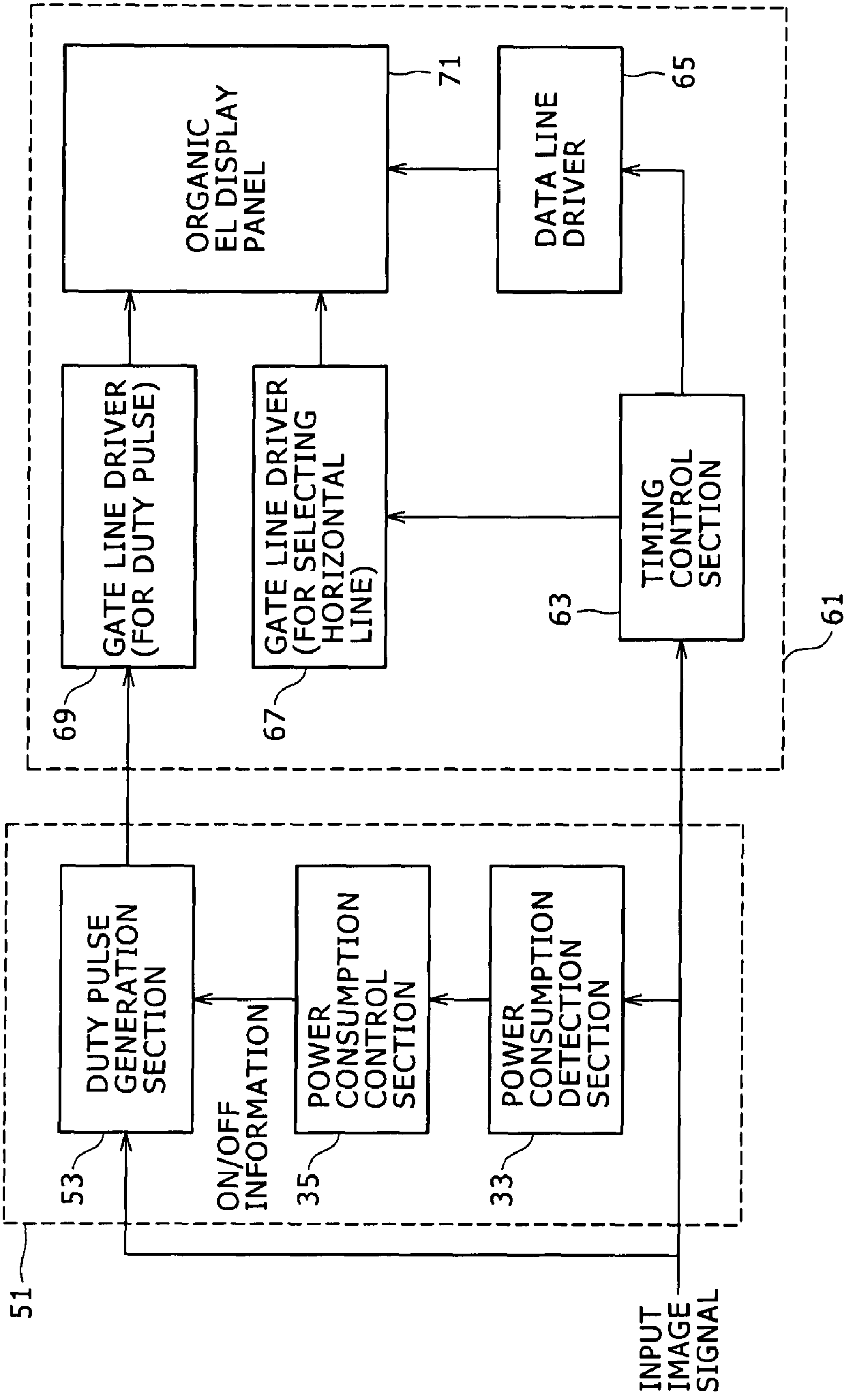
FIG. 13 shows an exemplary functional structure of a peak brightness control apparatus (exemplary application 1)

FIG. 13 is a functional block diagram of a peak brightness control apparatus 51 containing the power consumption detection apparatus. Note that in FIG. 13, parts having corresponding parts in FIG. 9 are assigned the same reference numerals as in FIG. 9. The peak brightness control apparatus 51 includes three functional blocks: the power consumption detection section 33, the power consumption control section 35, and a duty pulse generation section 53. Of the three functional blocks, the duty pulse generation section 53 corresponds to the peak brightness control signal generation section 37.

The duty pulse generated by the duty pulse generation section 53 is supplied to a gate line driver 69 within an organic EL panel module 61 to be used for controlling the illumination time of an organic EL display panel 71. Naturally, as the duty pulse, either of the above two types of duty pulses having different pulse widths is generated so as to be synchronized with the horizontal synchronization pulse.

The organic EL panel module 61 includes a timing control section 63, a data line driver 65, gate line drivers 67 and 69, and the organic EL display panel 71.

The timing control section 63 is a control device for generating a timing signal necessary for displaying the screen based on the input image signal.

The data line driver 65 is a circuit for driving data lines of the organic EL display panel 71. The data line driver 65 converts the gradation values that specify the brightness of the illumination of the pixels into analog voltage values, and supplies the analog voltage values to the data lines. The data line driver 65 is formed by a known drive circuit.

The gate line driver 67 is a circuit for selectively driving gate lines that are provided for selecting the horizontal line to which the gradation values are written, in accordance with the line-sequential scanning system. The gate line driver 67 is formed by a shift register that has stages that correspond in number to the vertical resolution. A signal for selecting the horizontal line is shifted sequentially with the timing synchronized with the horizontal synchronization pulses, while the signal is applied, via each register stage, to the corresponding gate line that extends in the horizontal direction. The gate line driver 67 is also formed by a known drive circuit.

The gate line driver 69 is a circuit for driving gate lines that are provided for transferring the duty pulses in accordance with the line-sequential scanning system. The gate line driver 69 is also formed by a shift register that has stages that correspond in number to the vertical resolution. In this exemplary application, a new duty pulse is inputted to a first register stage at each horizontal synchronization time point, so that the duty pulse is transferred sequentially. Needless to say, the duty pulse inputted to the first register stage has either of the above two types of pulse widths.

(b) Organic EL Display Panel

Figure 14:
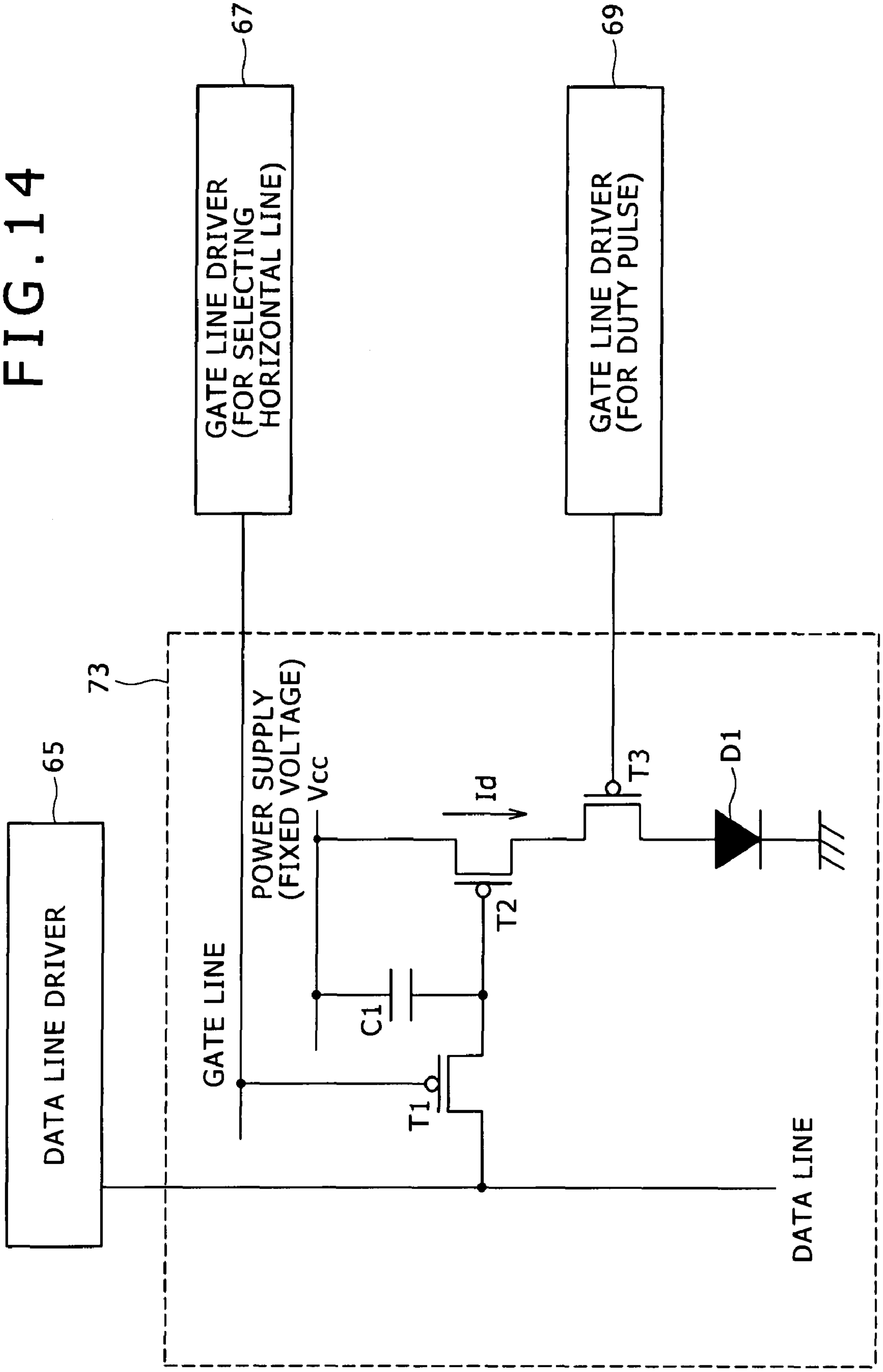
FIG. 14 is a diagram for explaining a structure of a display pixel (exemplary application 1)

The organic EL display panel 71 is a display device in which display pixels are arranged in a matrix. FIG. 14 shows an exemplary circuit of a display pixel 73. The display pixel 73 is arranged at an intersection of the data line and the gate line. The display pixel 73 includes a data switch element T1, a capacitor C1, a current supply element T2, and an illumination period control element T3.

The data switch element T1 is a transistor for controlling taking in of the voltage value supplied via the data line. Take-in timing is controlled by the gate line driver 67.

The capacitor C1 is a storage element for holding the taken-in voltage value for one frame period. Use of the capacitor C1 realizes an illumination mode similar to that of the frame-sequential scanning system.

The current supply element T2 is a transistor for supplying a drive current corresponding to the voltage value held in the capacitor C1 to an organic EL element D1.

The illumination period control element T3 is a transistor for controlling supply and stop of the drive current to the organic EL element D1.

The illumination period control element T3 is arranged in series with respect to a path along which the drive current is supplied. While the illumination period control element T3 is on, the organic EL element D1 is illuminated. Meanwhile, while the illumination period control element T3 is off, the organic EL element D1 is not illuminated.

(c) Duty Pulse Generation Section

Figure 15:
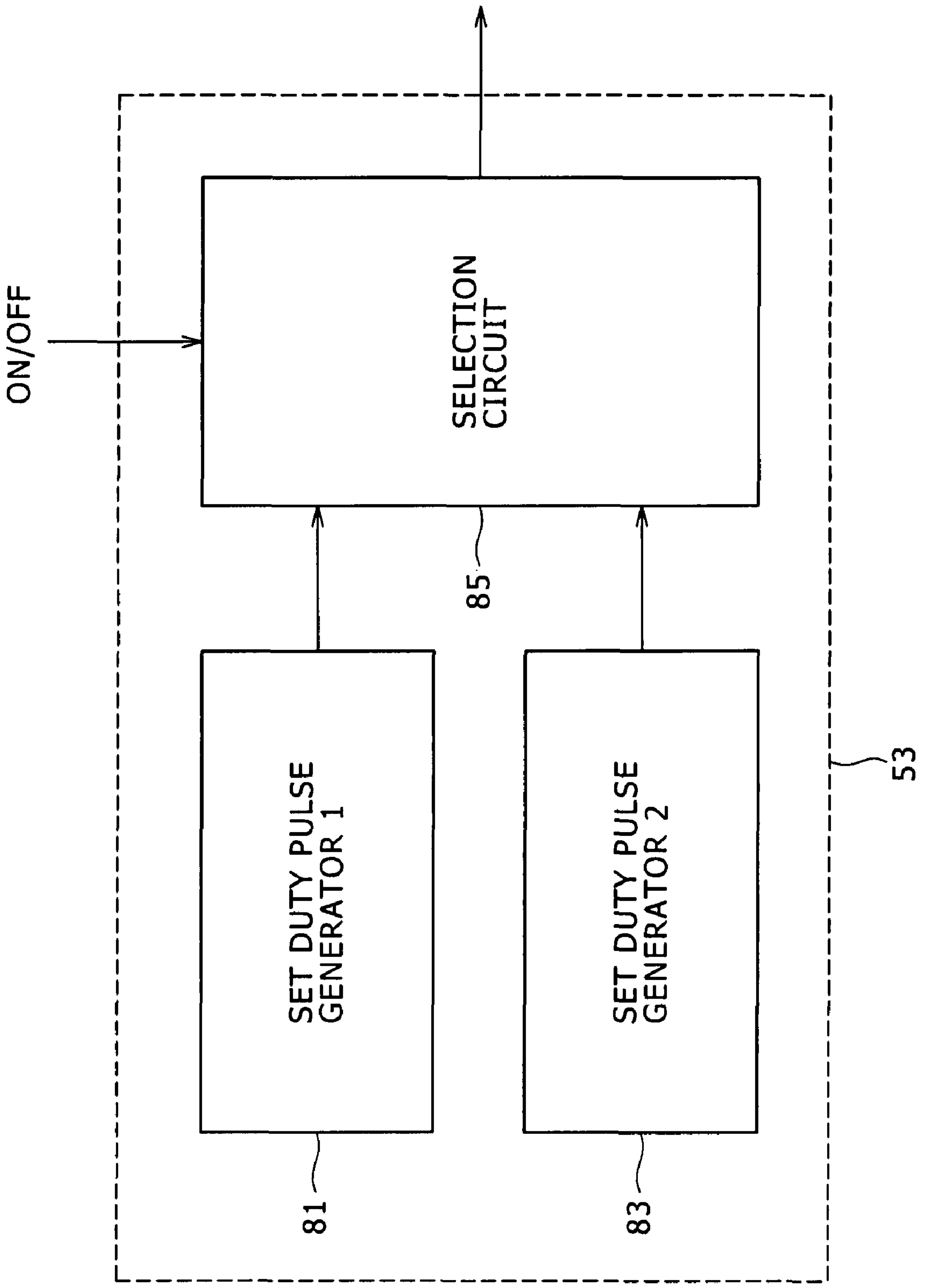
FIG. 15 shows an exemplary internal structure of a duty pulse generation section (exemplary application 1)

FIG. 15 shows an exemplary internal structure of the duty pulse generation section 53. The duty pulse generation section 53 includes three functional blocks: set duty pulse generators 81 and 83, and a selection circuit 85.

The set duty pulse generator 81 is a processing device for generating duty pulse 1, which has a relatively short L-level length. The set duty pulse generator 83 is a processing device for generating duty pulse 2, which has a relatively long L-level length.

Figures 16A, 16B, 16C:
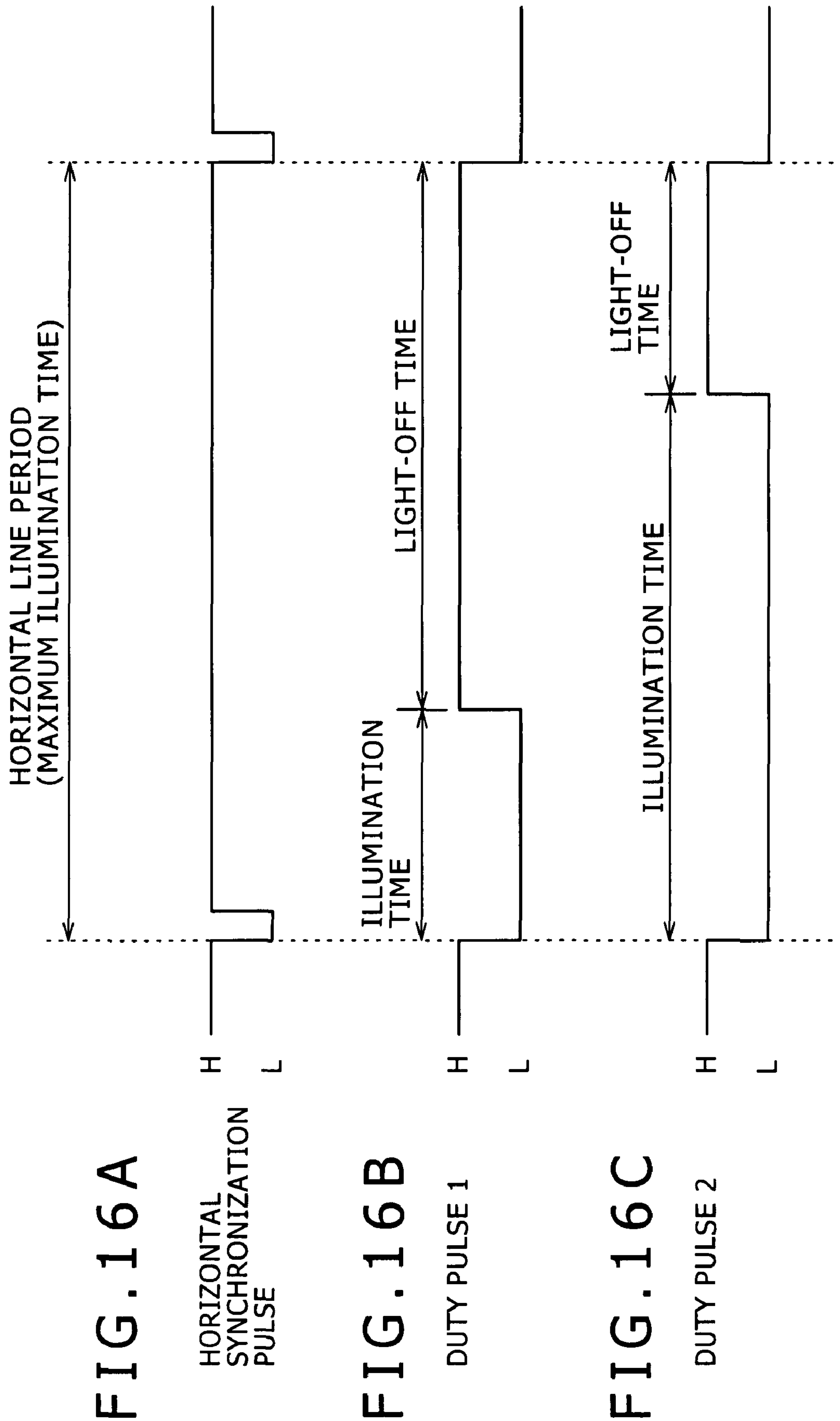
FIGS. 16A to 16C are diagrams for explaining the pulse width of duty pulse 1 and duty pulse 2 (exemplary application 1)

FIGS. 16A to 16C show duty pulse 1 and duty pulse 2.

The selection circuit 85 is a processing device for selectively outputting either duty pulse 1 or duty pulse 2 based on the control signal supplied from the power consumption control section 35.

In the present example, the selection circuit 85 selects duty pulse 1 (FIG. 16B) when the control signal indicates "ON" (i.e., when the predicted power consumption value exceeds the allowable power consumption value).

Meanwhile, the selection circuit 85 selects duty pulse 2 (FIG. 16C) when the control signal indicates "OFF" (i.e., when the predicted power consumption value does not exceed the allowable power consumption value).

(d) Operation and Effect of Peak Brightness Control

Figures 17A, 17B, 17C, 17D, 17E:
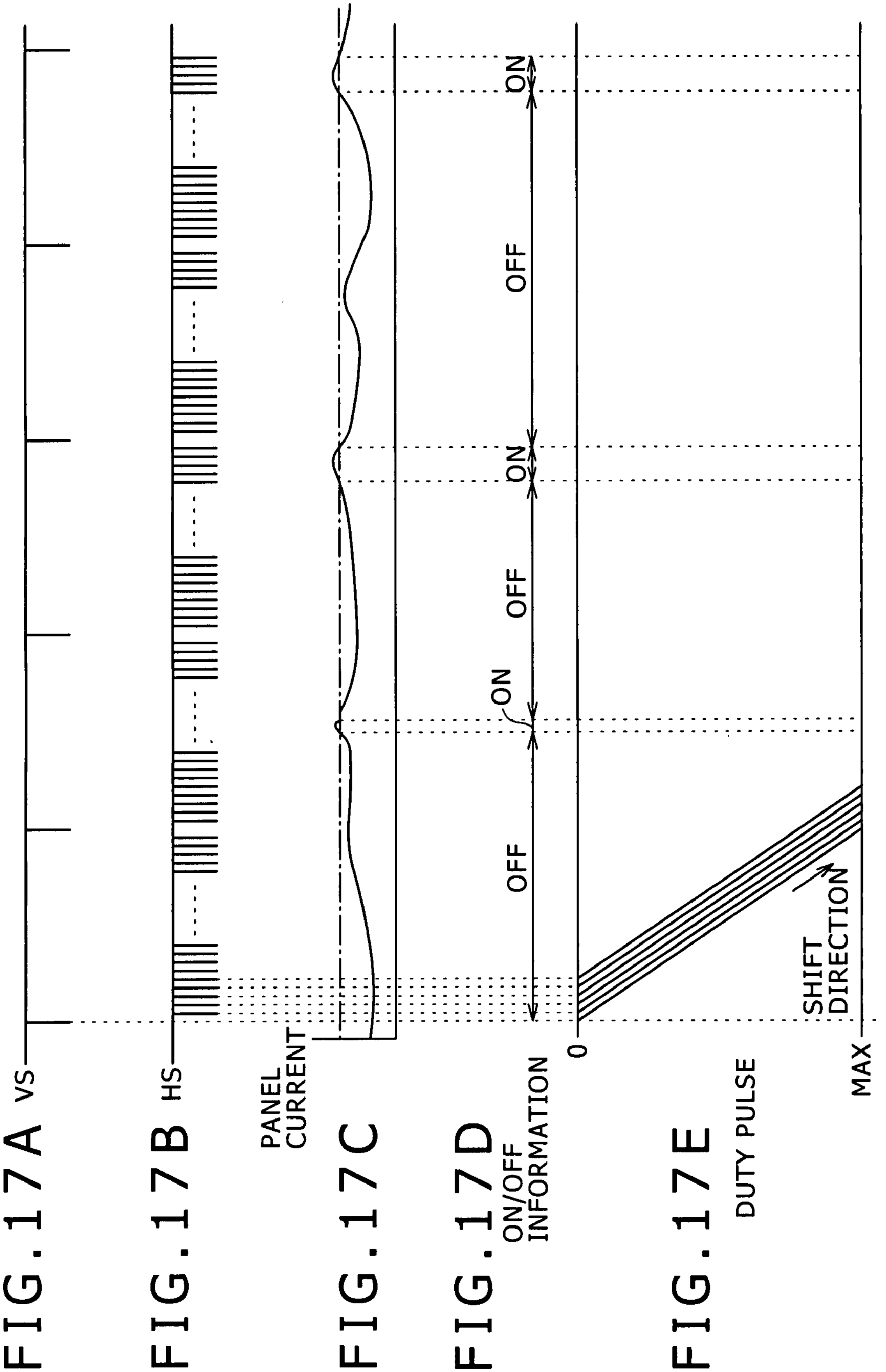
FIGS. 17A to 17E show an example of output of control pulses related to peak brightness control (exemplary application 1)

FIGS. 17A to 17E show an example of output of control pulses related to peak brightness control. FIG. 17A shows the input timing of the vertical synchronization pulses VS. FIG. 17B shows the input timing of the horizontal synchronization pulses HS.

FIG. 17C shows the variation of the panel current value over time. A dashed-dotted line in the figure represents the allowable power consumption value, which is a criterion used by the power consumption control section 35. In FIG. 17C, the panel current value exceeds the allowable power consumption value at three separate time periods.

FIG. 17D shows examples of the control signal outputted by the power consumption control section 35. In FIG. 17D, the control signal indicates "OFF" in most time periods. Note that the status of the control signal is switchable on a horizontal line by horizontal line basis.

FIG. 17E is a transition diagram for explaining the shifting of the duty pulses. Each oblique line represents how a duty pulse having a certain pulse width is shifted from one stage to the next over time. As shown in FIG. 17E, with focus on a certain time point, duty pulses that determine the illumination time of the respective horizontal lines differ in their generation time point.

Therefore, if it is determined even once that the allowable power consumption is exceeded, duty pulse 2, which has a short pulse width, controls the illumination of any one horizontal line at least for one frame period. This serves to reduce an actual power consumption value in a period for which the power consumption value is relatively high. As a result, it becomes possible to control the variation of the power consumption in accordance with the display of the display images to satisfy the range of the allowable power consumption value.

(B-3) Exemplary Application 2 (Duty Pulse Type)

Here, a method of regulating the duty pulse width to control the peak brightness of the organic EL display panel will be described. That is, instead of the control of switching between the two types of duty pulse widths, the duty pulse width is regulated steplessly.

(a) Apparatus Structure

Figure 18:
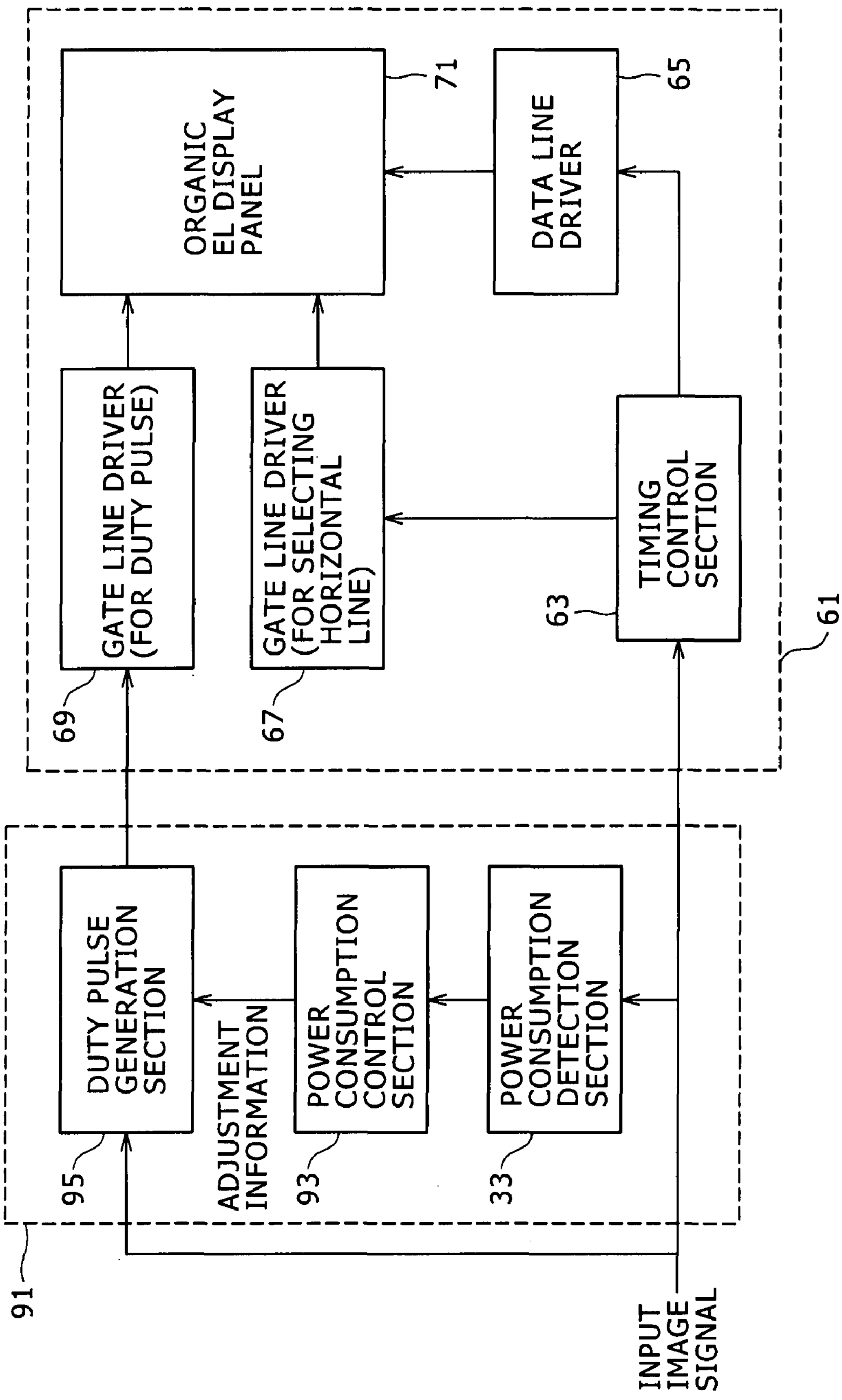
FIG. 18 shows an exemplary functional structure of a peak brightness control apparatus (exemplary application 2)

FIG. 18 is a functional block diagram of a peak brightness control apparatus 91 that contains the power consumption detection apparatus. Note that in FIG. 18, parts having corresponding parts in FIG. 13 are assigned the same reference numerals as in FIG. 13.

The peak brightness control apparatus 91 includes three functional blocks: the power consumption detection section 33, a power consumption control section 93, and a duty pulse generation section 95. Exemplary application 2 differs from exemplary application 1 in the power consumption control section 93 and the duty pulse generation section 95.

In the present exemplary application, when the predicted power consumption value of the entire display panel exceeds the allowable power consumption value, the power consumption control section 93 outputs, to the duty pulse generation section 95, adjustment information Δ to give an instruction to reduce the power consumption at least to an extent corresponding to an amount by which the predicted power consumption value of the entire display panel exceeds the allowable power consumption value. Note that when the allowable power consumption value is satisfied, the adjustment information indicates 0 (zero).

The duty pulse generation section 95 is a processing device for generating a duty pulse having a pulse width reduced by a length indicated by the adjustment information Δ.

Figure 19:
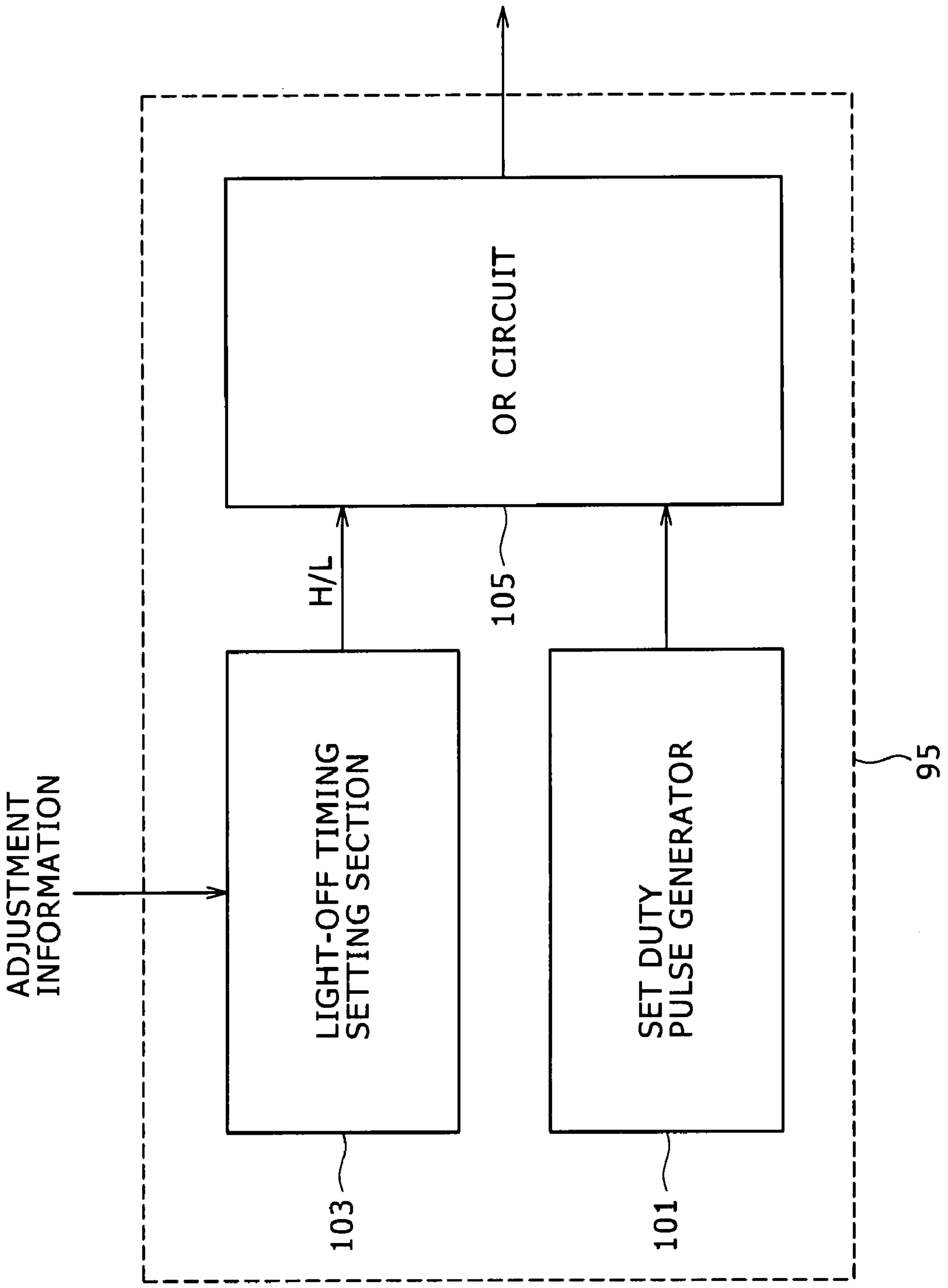
FIG. 19 shows an exemplary internal structure of a duty pulse generation section (exemplary application 2)

FIG. 19 shows an exemplary internal structure of the duty pulse generation section 95. The duty pulse generation section 95 includes three functional blocks: a set duty pulse generator 101, a light-off timing setting section 103, and an OR circuit 105.

The set duty pulse generator 101 is a processing device for generating a duty pulse having a fixed pulse width which is set beforehand. In the present example, the set duty pulse generator 101 generates a duty pulse in which the illumination time is 40% of the horizontal line period.

The light-off timing setting section 103 is a processing device for switching its output level from an L level to an H level with timing according to the adjustment information Δ.

The OR circuit 105 is a processing device for obtaining a logical disjunction of the duty pulse supplied from the set duty pulse generator 101 and a light-off timing signal supplied from the light-off timing setting section 103. The OR circuit 105 is formed by a logic circuit, for example.

Figures 20A, 20B, 20C, 20D:
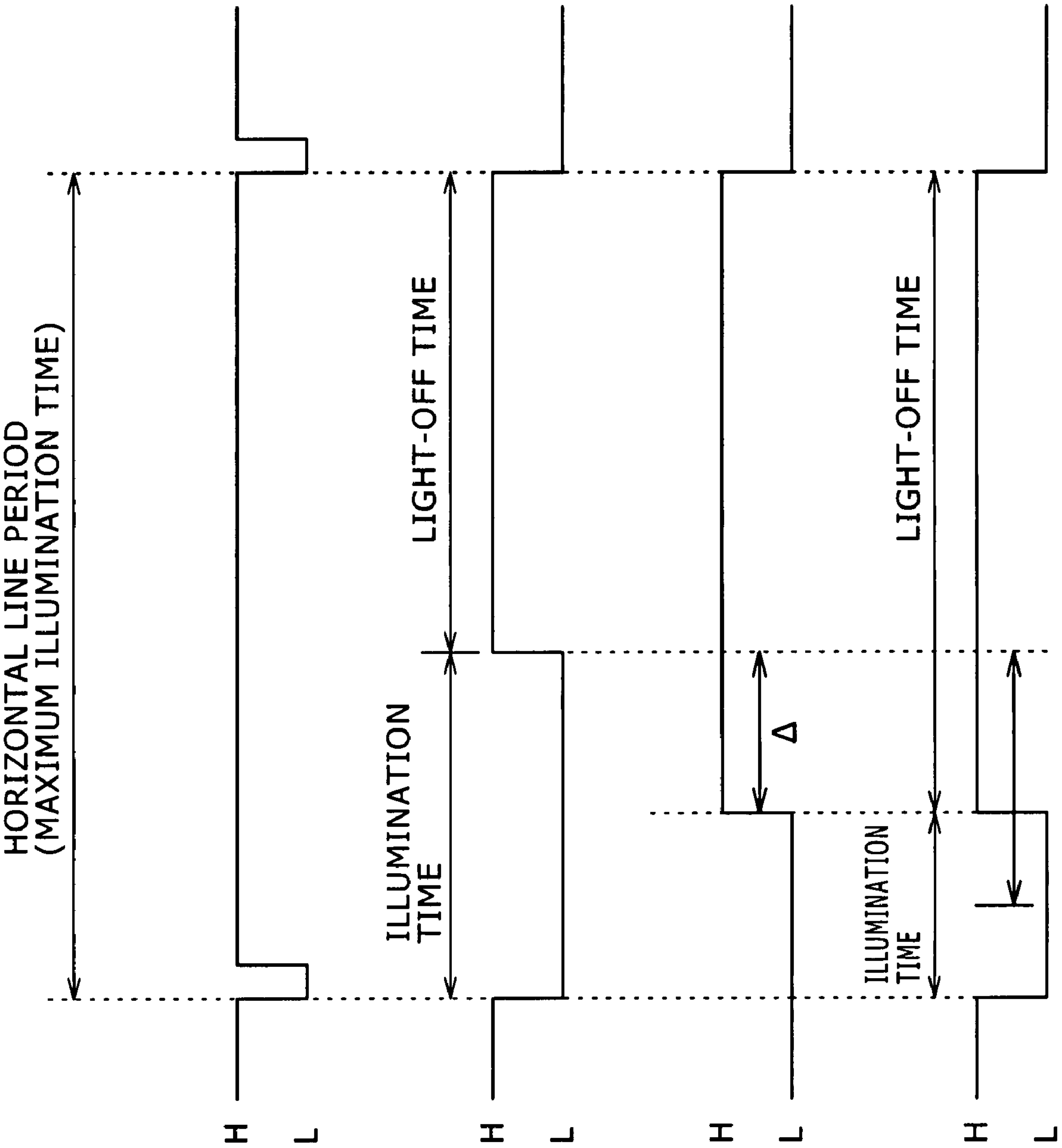
FIGS. 20A to 20D are diagrams for explaining principles of generation of the duty pulse (exemplary application 2)

FIGS. 20A to 20D show generation of the duty pulse by the duty pulse generation section 95. FIG. 20A shows the horizontal line period defined by the horizontal synchronization pulses. FIG. 20B shows an exemplary duty pulse generated by the set duty pulse generator 101.

FIG. 20C shows an exemplary light-off timing signal generated by the light-off timing setting section 103. The length of an L-level period of the light-off timing signal is varied in accordance with the adjustment information Δ. FIG. 20D shows an exemplary duty pulse outputted from the OR circuit 105. Because of the logical disjunction, the H level of the light-off timing signal has priority, and thus the duty pulse width is forcibly reduced.

(d) Operation and Effect of Peak Brightness Control

Figures 21A, 21B, 21C, 21D, 21E:
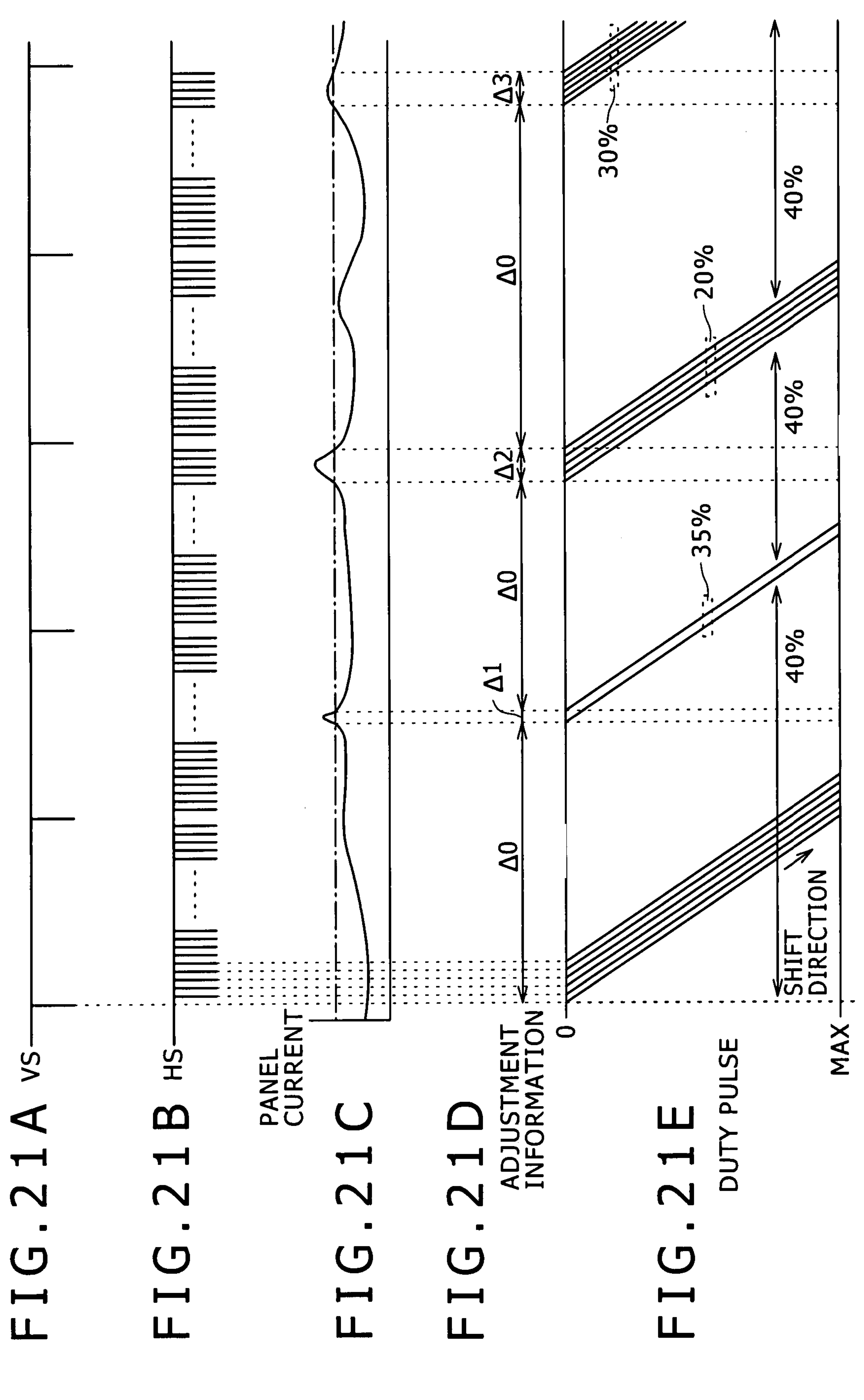
FIGS. 21A to 21E show variations in duty pulse width in accordance with the amount by which the power consumption exceeds an allowable power consumption value (exemplary application 2)

FIGS. 21A to 21E show an example of the output of control pulses related to the peak brightness control. FIG. 21A shows the input timing of the vertical synchronization pulses VS. FIG. 21B shows the input timing of the horizontal synchronization pulses HS.

FIG. 21C shows the variation of the panel current value over time. A dashed-dotted line in the figure represents the allowable power consumption value, which is a criterion used by the power consumption control section 93. In FIG. 21C, the panel current value exceeds the allowable power consumption value at three separate time periods.

FIG. 21D shows exemplary control signals outputted by the power consumption control section 93. In FIG. 21D, the adjustment information indicates Δ0 while the power consumption value satisfies the allowable power consumption value. While the power consumption value exceeds the allowable power consumption value, the adjustment information indicates Δ1, Δ2, or Δ3 depending on the amount by which the power consumption value exceeds the allowable power consumption value.

FIG. 21E is a transition diagram for explaining the shifting of the duty pulses. Each oblique line represents how a duty pulse having a certain pulse width is shifted from one stage to the next over time. In the case of FIG. 21E, a duty pulse that is generated in a horizontal line period for which the adjustment information indicates Δ0 is transferred sequentially, with the illumination time maintained at 40% of the horizontal line period.

Meanwhile, a duty pulse that is generated in a horizontal line period for which the amount by which the power consumption value exceeds the allowable power consumption value is relatively small (i.e., a horizontal line period for which the adjustment information indicates Δ1) is transferred sequentially, with the illumination time maintained at 35% of the horizontal line period. Meanwhile, a duty pulse that is generated in a horizontal line period for which the amount by which the power consumption value exceeds the allowable power consumption value is relatively large (i.e., a horizontal line period for which the adjustment information indicates Δ2) is transferred sequentially, with the illumination time maintained at 20% of the horizontal line period.

As described above, it is possible to prevent the actual power consumption from exceeding the allowable power consumption value, since the duty pulse having a reduced illumination time remains throughout one frame period (i.e., since the illumination time of at least one horizontal line is shortened while the horizontal line that has caused the power consumption to exceed the allowable power consumption value remains within the display screen).

(B-4) Exemplary Application 3 (Power Supply Voltage Type)

Here, a method for controlling the peak brightness of the organic EL display panel via switching control of a power supply voltage line will be described. Specifically, a power supply voltage is switched between two types of power supply voltages.

(a) Apparatus Structure

Figure 22:
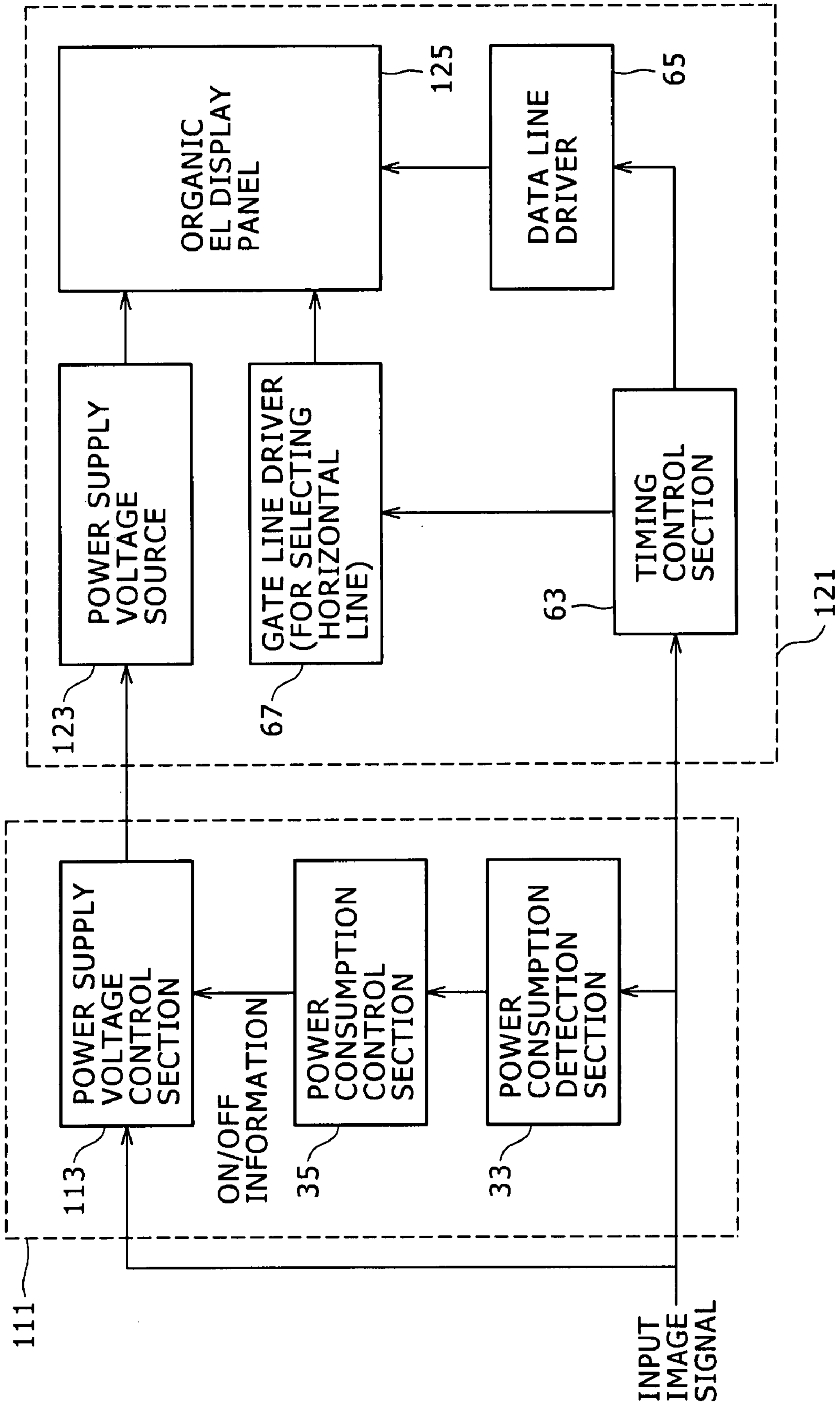
FIG. 22 shows an exemplary functional structure of a peak brightness control apparatus (exemplary application 3)

FIG. 22 is a functional block diagram of a peak brightness control apparatus 111 that contains the power consumption detection apparatus. Note that in FIG. 22, parts having corresponding parts in FIG. 13 are assigned the same reference numerals as in FIG. 13.

The peak brightness control apparatus 111 includes three functional blocks: the power consumption detection section 33, the power consumption control section 35, and a power supply voltage control section 113. Exemplary application 3 differs from exemplary application 1 in the power supply voltage control section 113.

Specifically, in the present exemplary application, a power supply voltage value generated by the power supply voltage control section 113 is supplied to a power supply voltage source 123 within an organic EL panel module 121 to be used for the control of the value of the power supply voltage applied to an organic EL display panel 125. Needless to say, as the power supply voltage value, either of two types of power supply voltage values is generated so as to be synchronized with the horizontal synchronization pulse.

The organic EL panel module 121 includes the timing control section 63, the data line driver 65, the gate line driver 67, the power supply voltage source 123, and the organic EL display panel 125. The power supply voltage source 123 selectively supplies, to a power supply line, an analog voltage corresponding to the power supply voltage value supplied from the power supply voltage control section 113. The power supply voltage source 123 is formed by a digital to analog conversion circuit, for example.

(b) Organic EL Display Panel

Figure 23:
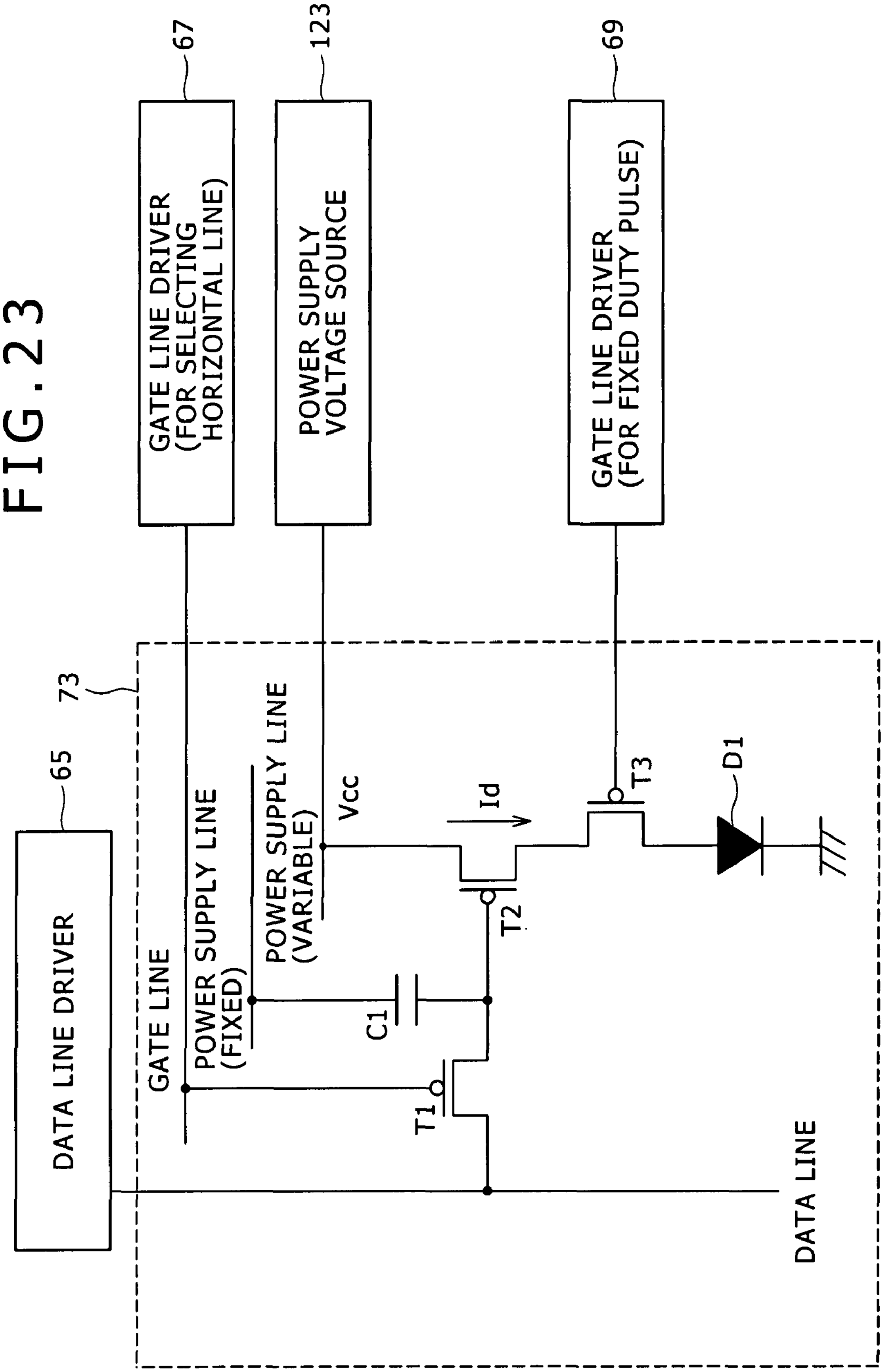
FIG. 23 is a diagram for explaining the structure of a display pixel (exemplary application 3)

The organic EL display panel 125 is a display device in which display pixels are arranged in a matrix. FIG. 23 shows an exemplary manner in which the display pixel 73 is connected to the power supply voltage source 123. The internal structure of the display pixel 73 is the same as the structure shown in FIG. 14. Therefore, detailed description thereof is omitted.

As shown in FIG. 23, two types of analog voltages supplied from the power supply voltage source 123 are provided to a source terminal of the current supply element T2 via the power supply line.

As shown in FIG. 23, in this exemplary application, the illumination time of the duty pulse for controlling the illumination period control element T3 is fixed.

(c) Duty Pulse Generation Section

Figure 24:
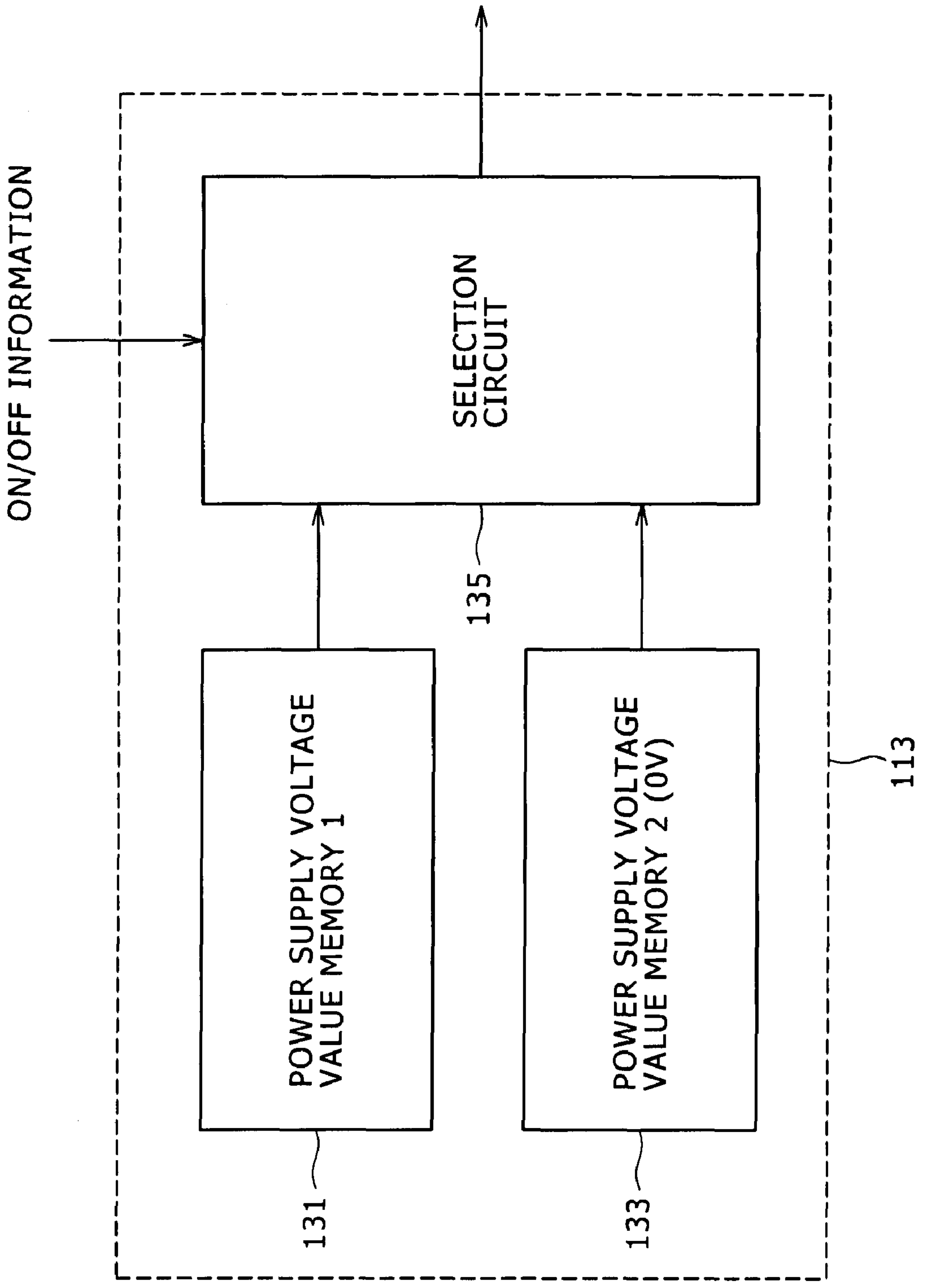
FIG. 24 shows an exemplary internal structure of a power supply voltage control section (exemplary application 3)

FIG. 24 shows an exemplary internal structure of the power supply voltage control section 113. The power supply voltage control section 113 includes three functional blocks: power supply voltage value memories 131 and 133, and a selection circuit 135.

The power supply voltage value memory 131 is a storage device for storing a standard power supply voltage value. The power supply voltage value memory 131 is formed by a RAM, a ROM, or other storage elements, for example. The power supply voltage value memory 133 is a storage device for storing a power supply voltage value (0 V) used for a period for which the power consumption value exceeds the allowable power consumption value. The power supply voltage value memory 133 is also formed by a RAM, a ROM, or other storage elements, for example.

The selection circuit 135 is a processing device for selectively outputting either power supply voltage value 1 (i.e., the standard value) or power supply voltage value 2 (i.e., 0 V) based on the control signal supplied from the power consumption control section 35.

In this example, the selection circuit 135 selects power supply voltage value 1 (i.e., the standard value) when the control signal indicates "ON" (i.e., when the predicted power consumption value exceeds the allowable power consumption value).

Meanwhile, the selection circuit 135 selects power supply voltage value 2 (i.e., 0 V) when the control signal indicates "OFF" (i.e., when the predicted power consumption value does not exceed the allowable power consumption value).

(d) Operation and Effect of Peak Brightness Control

Figures 25A, 25B, 25C, 25D, 25E:
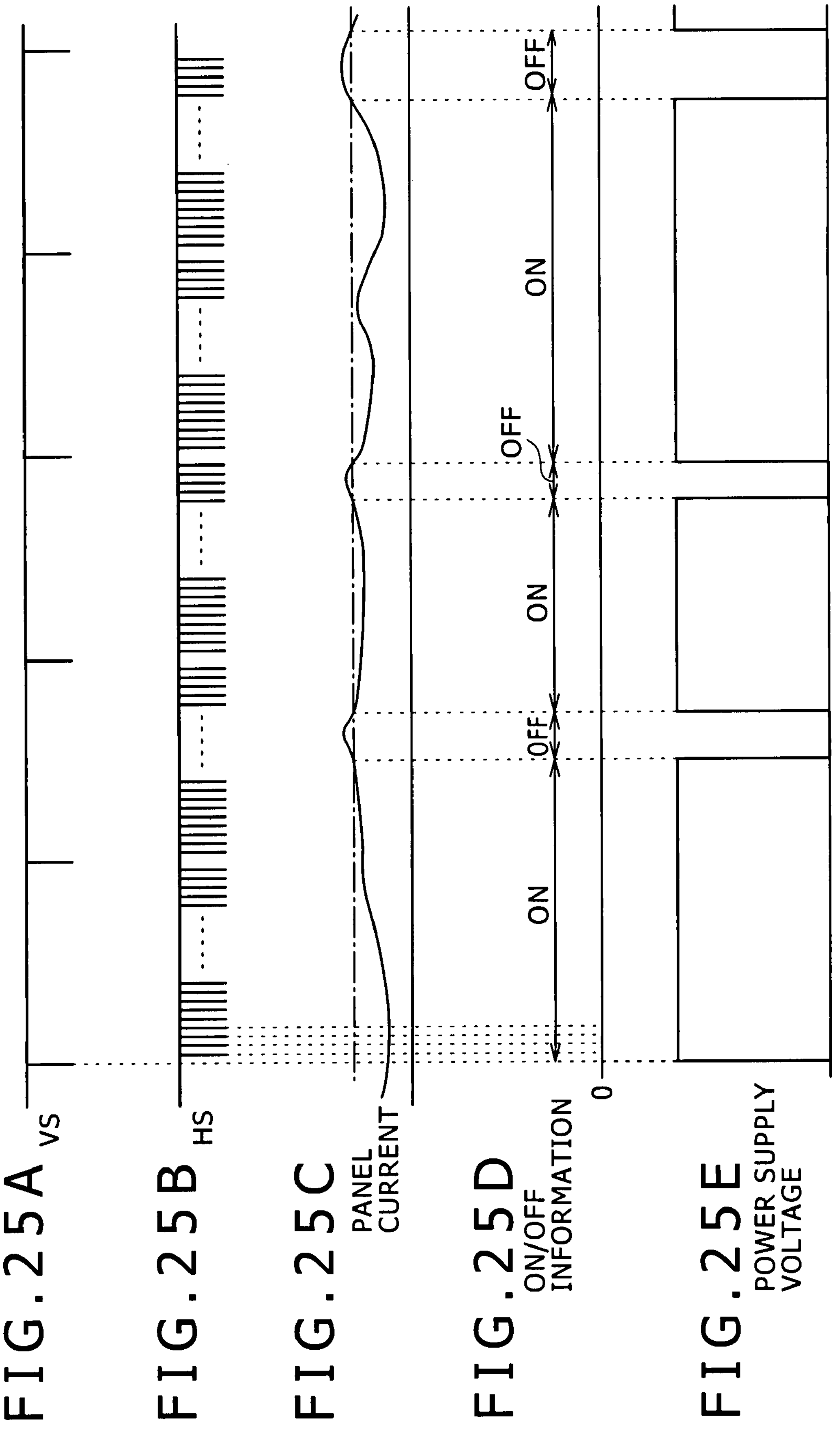
FIGS. 25A to 25E show an example of the output of control pulses related to peak brightness control (exemplary application 3)

FIGS. 25A to 25E show an example of the output of control pulses related to the peak brightness control. FIG. 25A shows the input timing of the vertical synchronization pulses VS. FIG. 25B shows the input timing of the horizontal synchronization pulses HS.

FIG. 25C shows the variation of the panel current value over time. A dashed-dotted line in the figure represents the allowable power consumption value, which is the criterion used by the power consumption control section 35. In FIG. 25C, the panel current value exceeds the allowable power consumption value at three separate time periods.

FIG. 25D shows exemplary control signals outputted by the power consumption control section 35. In FIG. 25D, the control signal indicates "OFF" in most time periods. Note that the status of the control signal is switchable on a horizontal line by horizontal line basis.

FIG. 25E shows variation of the value of the power supply voltage that is actually applied in accordance with the control by the power supply voltage control section 113. As shown in FIG. 25E, the power supply voltage value is 0 V only while the power consumption value exceeds the allowable power consumption value. That is, during such a period, the entire display screen is forcibly turned off. Needless to say, while the power consumption value satisfies the allowable power consumption value, the standard power supply voltage value is applied so that the entire display screen is illuminated.

As described above, in this exemplary application, the screen is forcibly turned off while the power consumption value exceeds the allowable power consumption. Thus, it is possible to prevent the actual power consumption value from exceeding the allowable power consumption. (B-5) Exemplary Application 4 (Power Supply Voltage Type)

Here, a method of regulating the power supply voltage value to control the peak brightness of the organic EL display panel will be described. Specifically, instead of the control of switching between the two types of power supply voltage values, the power supply voltage value is regulated steplessly.

(a) Apparatus Structure

Figure 26:
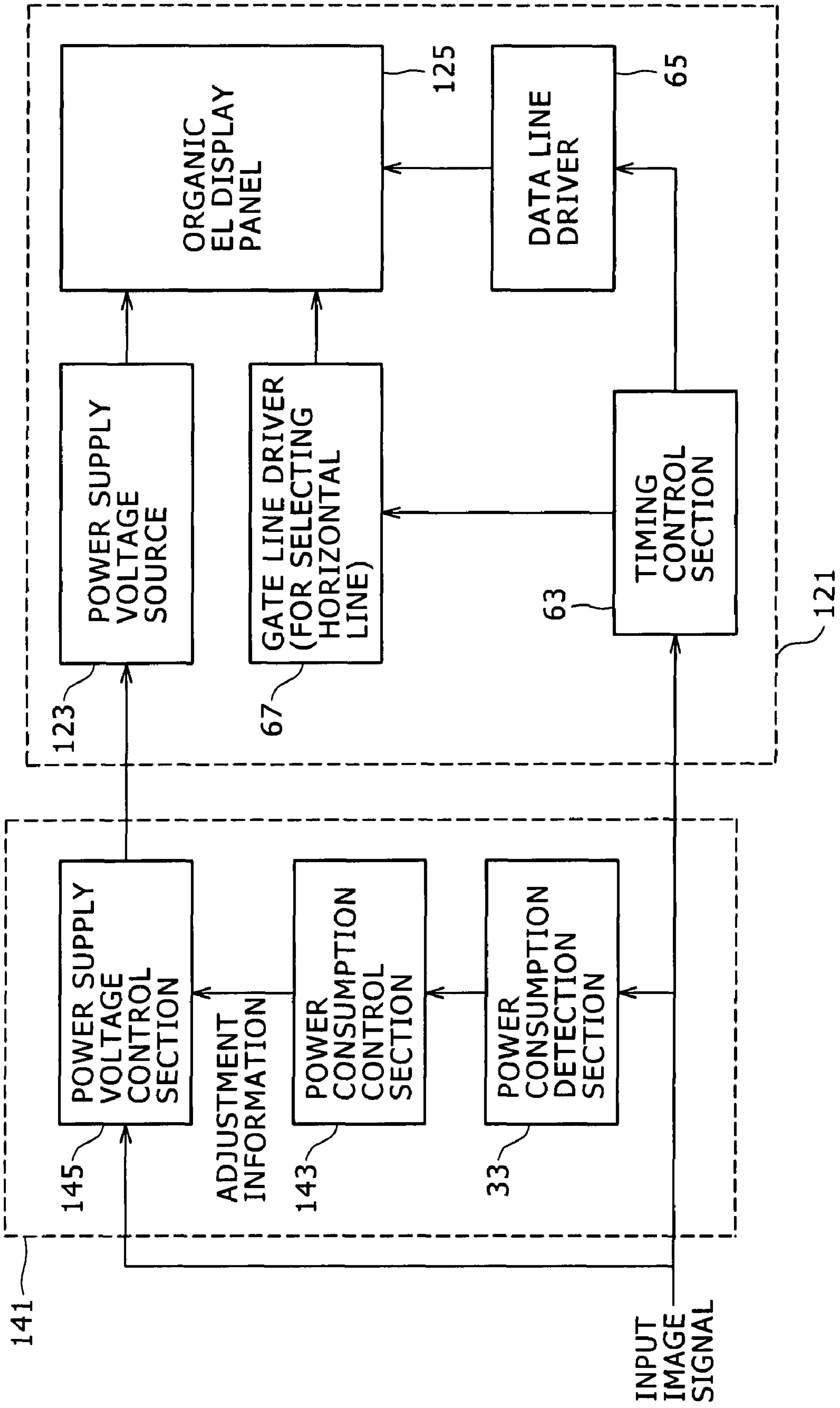
FIG. 26 shows an exemplary functional structure of a peak brightness control apparatus (exemplary application 4)

FIG. 26 is a functional block diagram of a peak brightness control apparatus 141 that contains the power consumption detection apparatus. Note that in FIG. 26, parts having corresponding parts in FIG. 22 are assigned the same reference numerals as in FIG. 22.

The peak brightness control apparatus 141 includes three functional blocks: the power consumption detection section 33, a power consumption control section 143, and a power supply voltage control section 145. Exemplary application 4 differs from exemplary application 3 in the power consumption control section 143 and the power supply voltage control section 145.

In the present exemplary application, the power consumption control section 143 outputs, to the power supply voltage control section 145, adjustment information Δ to give an instruction to reduce the power consumption by the amount by which the predicted power consumption value of the entire display panel exceeds the allowable power consumption value. Note that when the allowable power consumption value is satisfied, the adjustment information Δ indicates 0 (zero).

The power supply voltage control section 145 is a processing device for allowing the power supply voltage value to be supplied to the power supply voltage source 123 to be lower than a standard value by an amount indicated by the adjustment information Δ.

Figure 27:
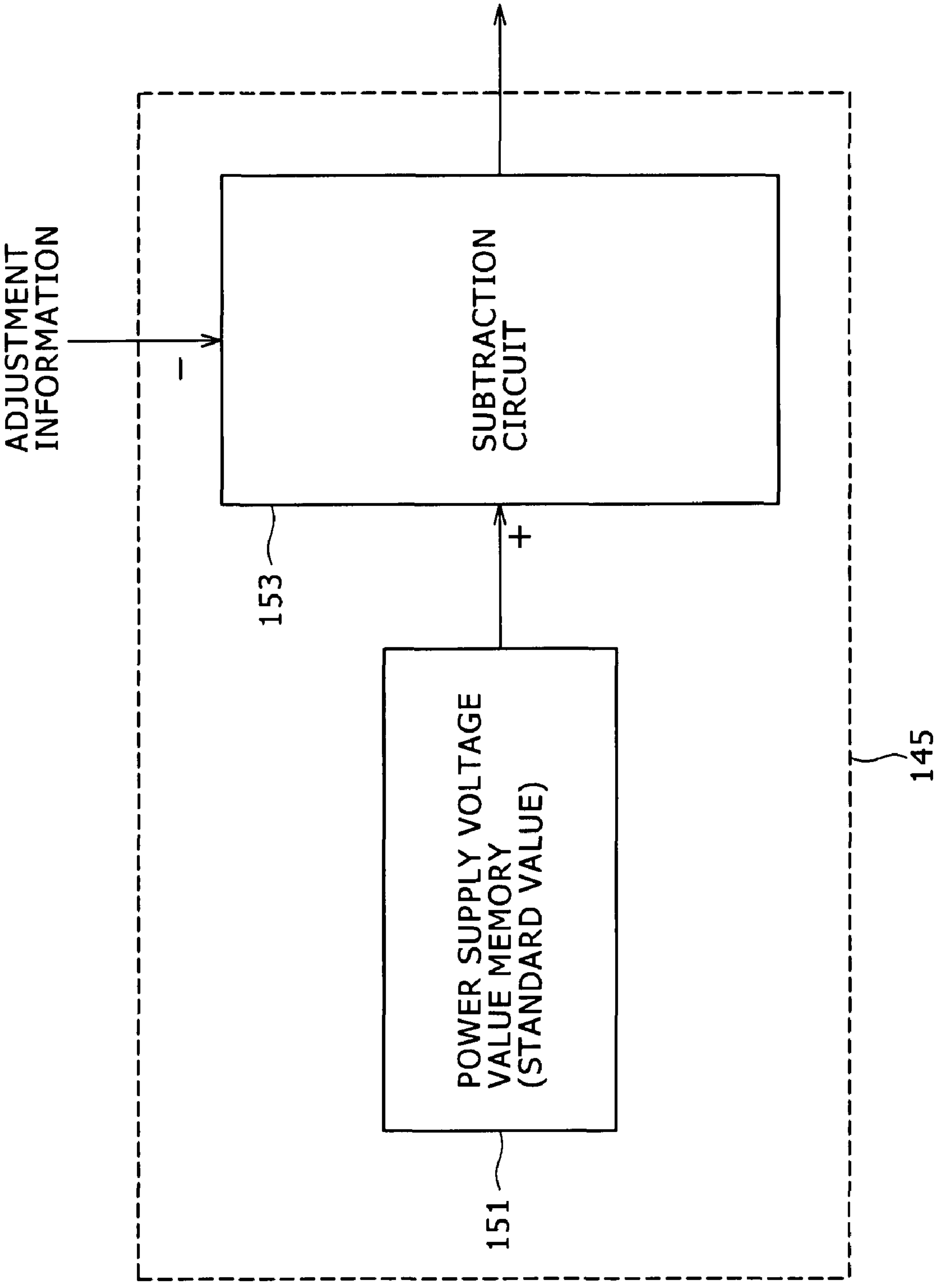
FIG. 27 shows an exemplary internal structure of a power supply voltage control section (exemplary application 4)

FIG. 27 shows an exemplary internal structure of the power supply voltage control section 145. The power supply voltage control section 145 includes two functional blocks: a power supply voltage value memory 151 and a subtraction circuit 153.

The power supply voltage value memory 151 is a storage device for storing the standard value of the power supply voltage, which is set beforehand. The power supply voltage value memory 151 is formed by a RAM, a ROM, or other storage elements, for example.

The subtraction circuit 153 is a processing device for subtracting the amount indicated by the adjustment information Δ from the power supply voltage value supplied from the power supply voltage value memory 151. The subtraction circuit 153 is formed by a logic circuit, for example.

(d) Operation and Effect of Peak Brightness Control

Figures 28A, 28B, 28C, 28D, 28E:
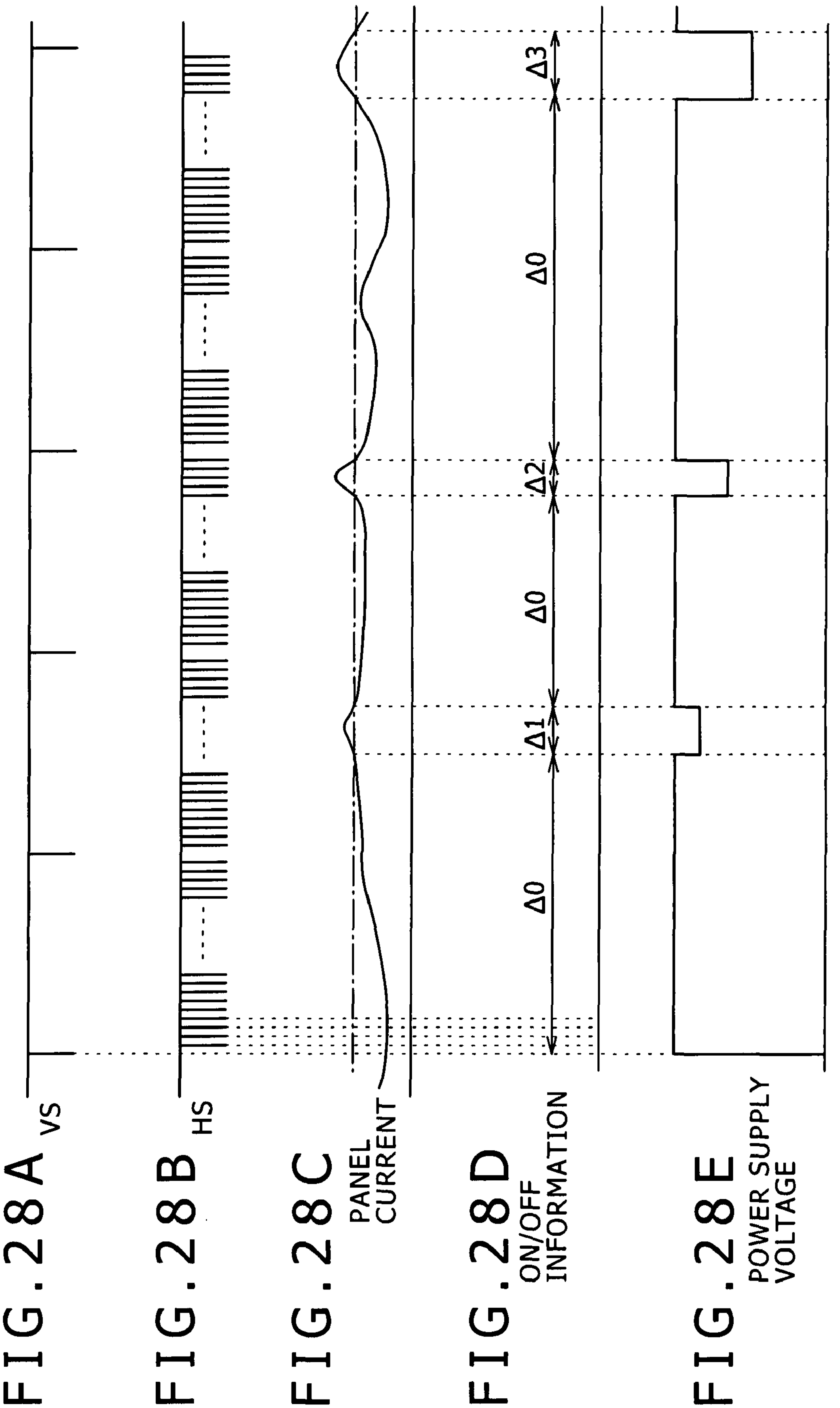
FIGS. 28A to 28E show an example of the output of control pulses related to peak brightness control (exemplary application 4)

FIGS. 28A to 28E show an example of the output of the control pulses related to the peak brightness control. FIG. 28A shows the input timing of the vertical synchronization pulses VS. FIG. 28B shows the input timing of the horizontal synchronization pulses HS.

FIG. 28C shows the variation of the panel current value over time. A dashed-dotted line in the figure represents the allowable power consumption value, which is a criterion used by the power consumption control section 143. In FIG. 28C, the panel current value exceeds the allowable power consumption value at three separate time periods.

FIG. 28D shows exemplary control signals outputted by the power consumption control section 143. In FIG. 28D, the adjustment information indicates Δ0 while the power consumption value satisfies the allowable power consumption value. While the power consumption value exceeds the allowable power consumption value, the adjustment information indicates Δ1, Δ2, or Δ3 depending on the amount by which the power consumption value exceeds the allowable power consumption value.

FIG. 28E shows variation of the value of the power supply voltage that is actually applied in accordance with the control by the power supply voltage control section 145. In the case of FIG. 28E, in a horizontal line period for which the adjustment information indicates Δ0, the standard power supply voltage value is applied. Meanwhile, in a horizontal line period for which the power consumption value exceeds the allowable power consumption value, a power voltage having a voltage value lower than the standard value by the amount indicated by the adjustment information, Δ1, Δ2, or Δ3, is applied.

As described above, in this exemplary application, it is possible to maintain display of the screen with reduced peak brightness, without the entire display screen being turned off, even while the power consumption value exceeds the allowable power consumption value. Thus, it is possible to minimize deterioration in image quality. Needless to say, it is also possible to prevent the actual power consumption value from exceeding the allowable power consumption.

(H) Other Exemplary Embodiments (H-1) Exemplary Implementations

Here, exemplary implementations of the above-described power consumption detection apparatus and peak brightness control apparatus will be described.

(a) Self-Luminous Display Apparatus

Figure 29:
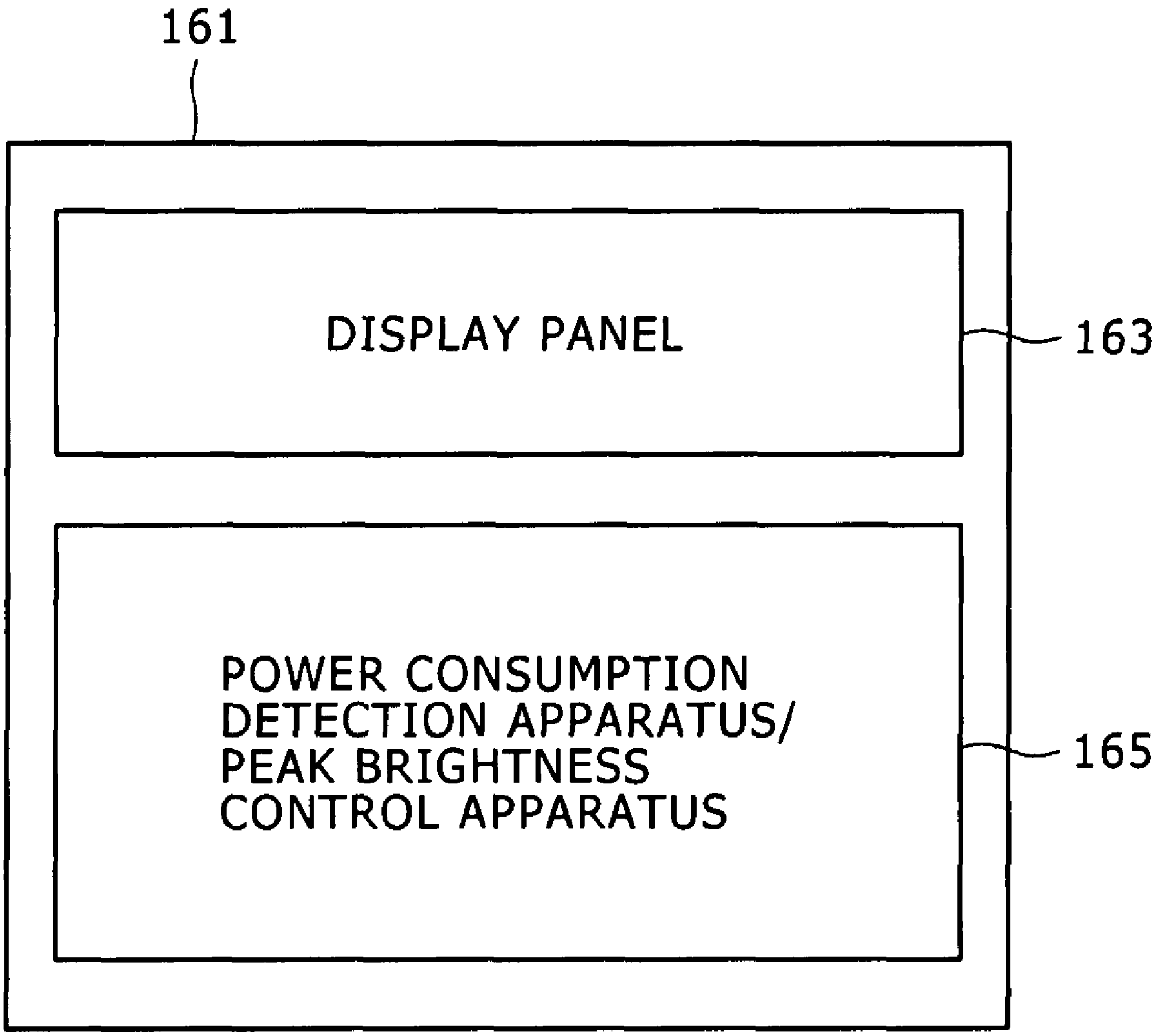
FIG. 29 shows exemplary implementation in a self-luminous display apparatus.

Referring to FIG. 29, the power consumption detection apparatus and the peak brightness control apparatus may be contained in a self-luminous display apparatus (including a panel module) 161.

In FIG. 29, the self-luminous display apparatus 161 contains a display panel 163, and a power consumption detection apparatus/peak brightness control apparatus 165.

(b) Image Processing Apparatus

Figure 30:
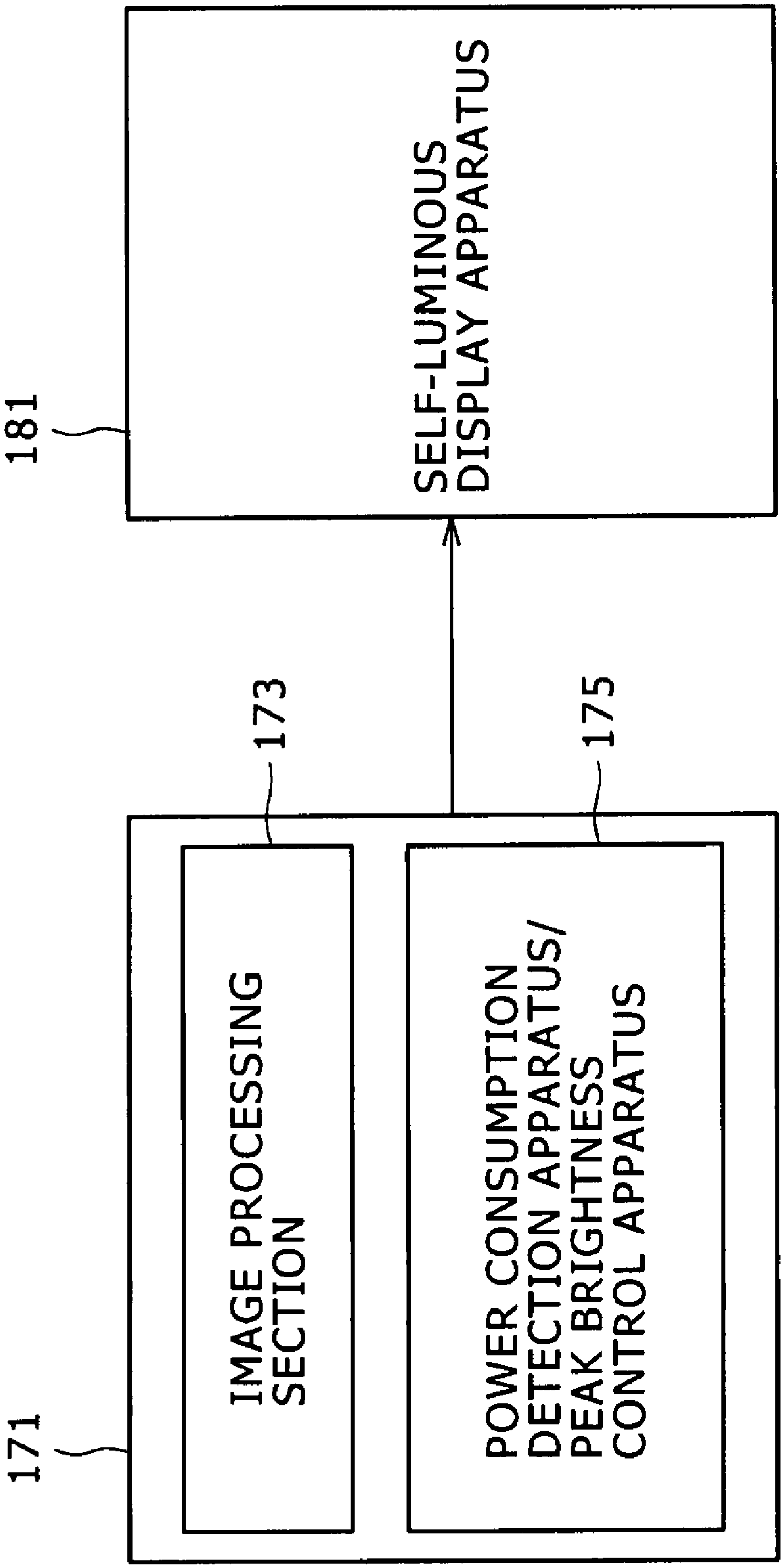
FIG. 30 shows exemplary implementation in an image processing apparatus.

Referring to FIG. 30, the power consumption detection apparatus and the peak brightness control apparatus may be contained in an image processing apparatus 171 as an external device for supplying the image signal to a self-luminous display apparatus 181.

In FIG. 30, the image processing apparatus 171 contains an image processing section 173, and a power consumption detection apparatus/peak brightness control apparatus 175.

(c) Electronic Devices

The power consumption detection apparatus and the peak brightness control apparatus may be contained in various electronic devices that contain the self-luminous display apparatus. Note that the electronic devices may be either of a portable type or of a stationary type. Also note that the self-luminous display apparatus need not necessarily be contained in the electronic devices.

(c1) Broadcast Wave Reception Apparatus

The power consumption detection apparatus and the peak brightness control apparatus may be contained in a broadcast wave reception apparatus.

Figure 31:
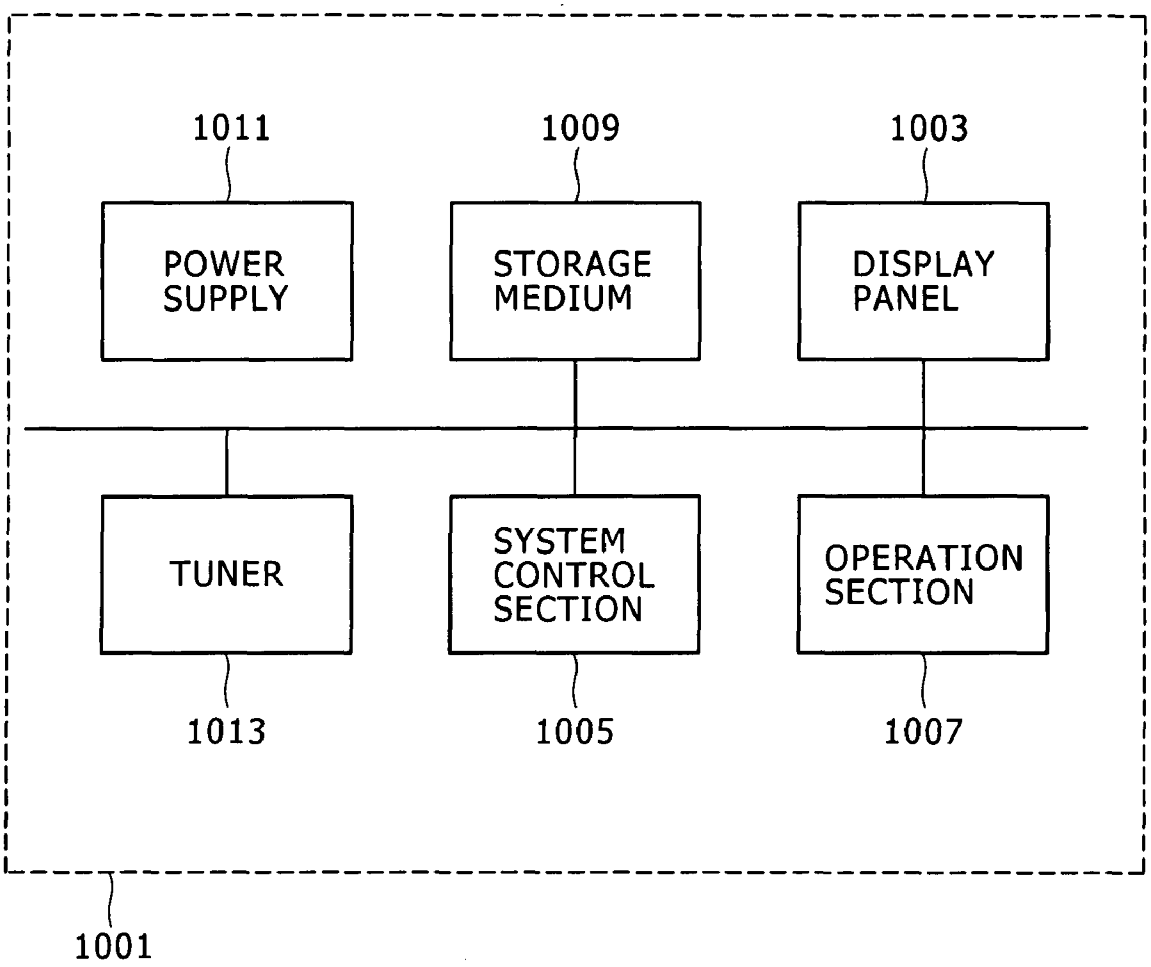
FIG. 31 shows exemplary implementation in an electronic device.

FIG. 31 shows an exemplary functional structure of a broadcast wave reception apparatus 1001. The broadcast wave reception apparatus 1001 contains, as primary components, a display panel 1003, a system control section 1005, an operation section 1007, a storage medium 1009, a power supply 1011, and a tuner 1013.

The system control section 1005 is formed by a microprocessor, for example. The system control section 1005 controls an overall system operation. The operation section 1007 may be a mechanical operation unit or a graphic user interface.

The storage medium 1009 is used as storage space for data corresponding to an image or video displayed on the display panel 1003, firmware, an application program, etc. In the case where the broadcast wave reception apparatus 1001 is of a portable type, a battery power supply is used as the power supply 1011. Needless to say, in the case where the broadcast wave reception apparatus 1001 is of a stationary type, a commercial power supply may be used.

The tuner 1013 is a wireless device for selectively receiving a broadcast wave of a specific channel selected by a user among incoming broadcast waves.

The structure of this broadcast wave reception apparatus can be applied to a television program receiver or a radio program receiver, for example.

(c2) Audio System

The power consumption detection apparatus and the peak brightness control apparatus may be contained in an audio system.

Figure 32:
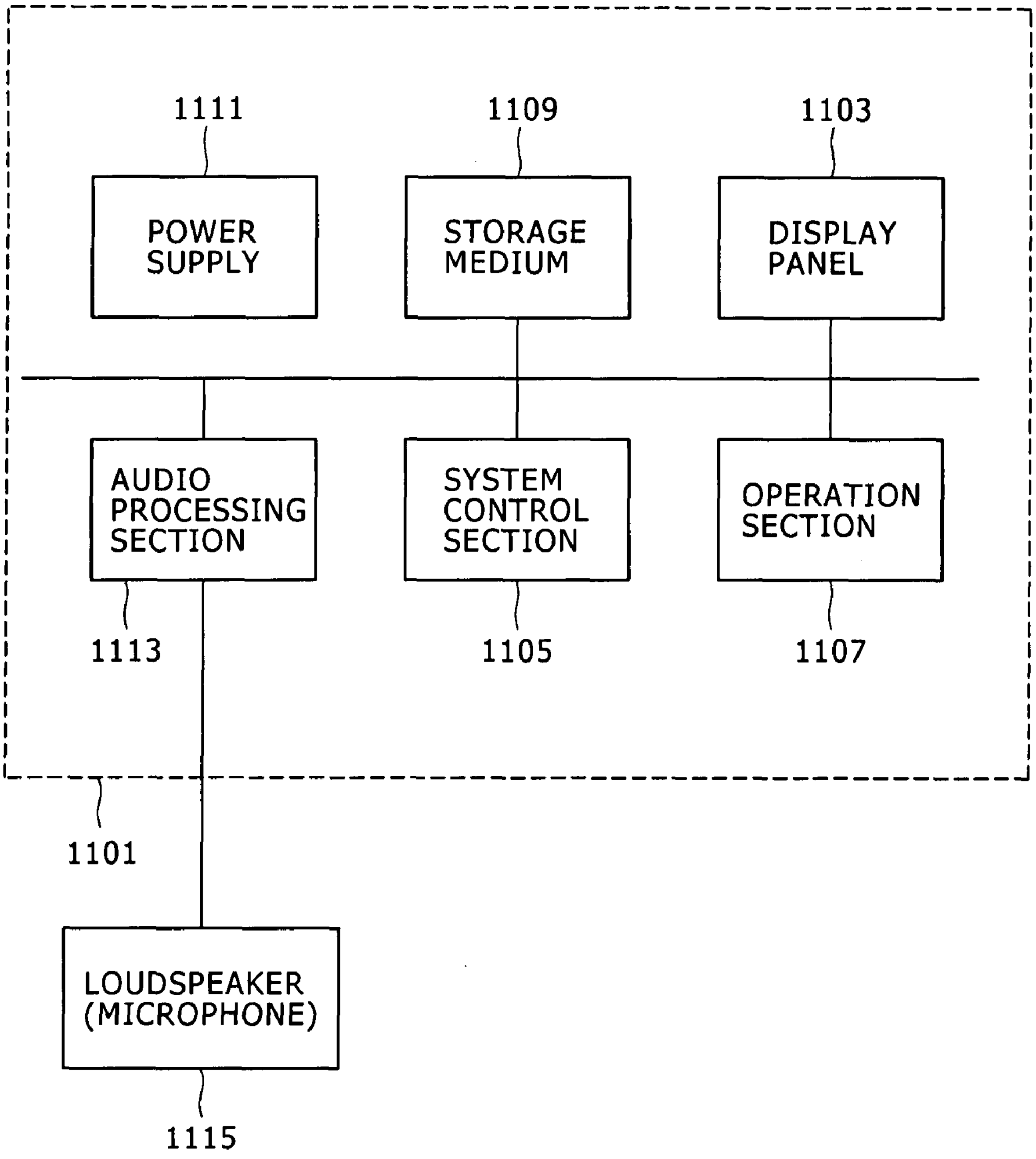
FIG. 32 shows exemplary implementation in an electronic device.

FIG. 32 shows an exemplary functional structure of an audio system 1101 as a playback device.

The audio system 1101 as the playback device contains, as primary components, a display panel 1103, a system control section 1105, an operation section 1107, a storage medium 1109, a power supply 1111, an audio processing section 1113, and a loudspeaker 1115.

In this case also, the system control section 1105 is formed by a microprocessor, for example. The system control section 1105 controls an overall system operation. The operation section 1107 may be a mechanical operation unit or a graphic user interface.

The storage medium 1109 is storage space for audio data, firmware, an application program, etc. In the case where the audio system 1101 is of a portable type, a battery power supply is used as the power supply 1111. Needless to say, in the case where the audio system 1101 is of a stationary type, the commercial power supply may be used.

The audio processing section 1113 is a processing device for subjecting the audio data to signal processing. Decompression of compressed audio data is also executed therein. The loudspeaker 1115 is a device for outputting reproduced sound.

In the case where the audio system 1101 is used as a recorder, a microphone is connected thereto in place of the loudspeaker 1115. In this case, the audio processing section 1113 may have a function of compressing the audio data.

(c3) Communication Apparatus

The power consumption detection apparatus and the peak brightness control apparatus may be contained in a communication apparatus.

Figure 33:
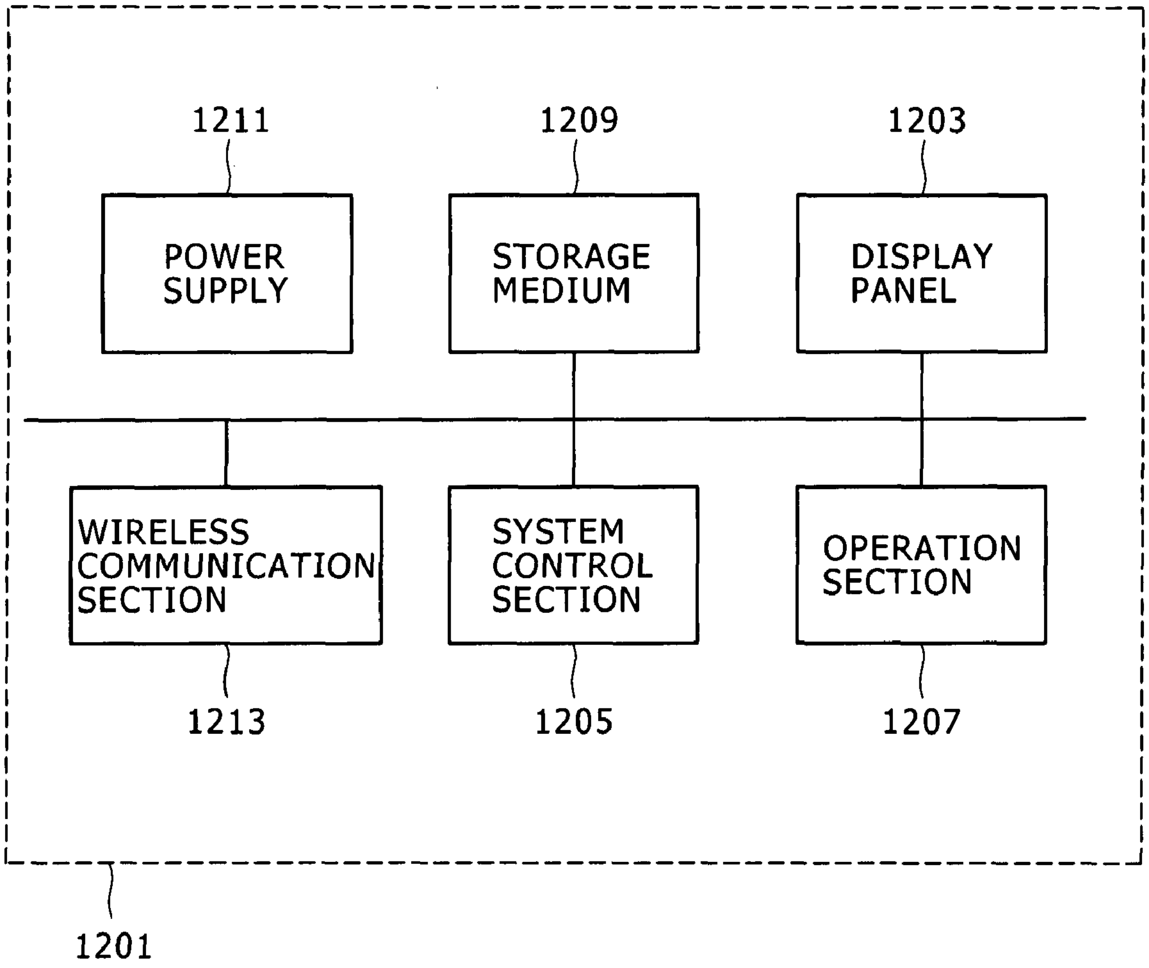
FIG. 33 shows exemplary implementation in an electronic device.

FIG. 33 shows an exemplary functional structure of a communication apparatus 1201. The communication apparatus 1201 contains, as primary components, a display panel 1203, a system control section 1205, an operation section 1207, a storage medium 1209, a power supply 1211, and a wireless communication section 1213.

The system control section 1205 is formed by a microprocessor, for example. The system control section 1205 controls an overall system operation. The operation section 1207 may be a mechanical operation unit or a graphic user interface.

The storage medium 1209 is used as storage space for a data file corresponding to an image or video displayed on the display panel 1203, firmware, an application program, etc. In the case where the communication apparatus 1201 is of a portable type, a battery power supply is used as the power supply 1211. Needless to say, in the case where the communication apparatus 1201 is of a stationary type, the commercial power supply may be used.

The wireless communication section 1213 is a wireless device for transmitting and receiving data to or from another device. The structure of this communication apparatus can be applied to a stationary telephone or a mobile phone, for example.

(c4) Image Pickup Apparatus

The power consumption detection apparatus and the peak brightness control apparatus may be contained in an image pickup apparatus.

Figure 34:
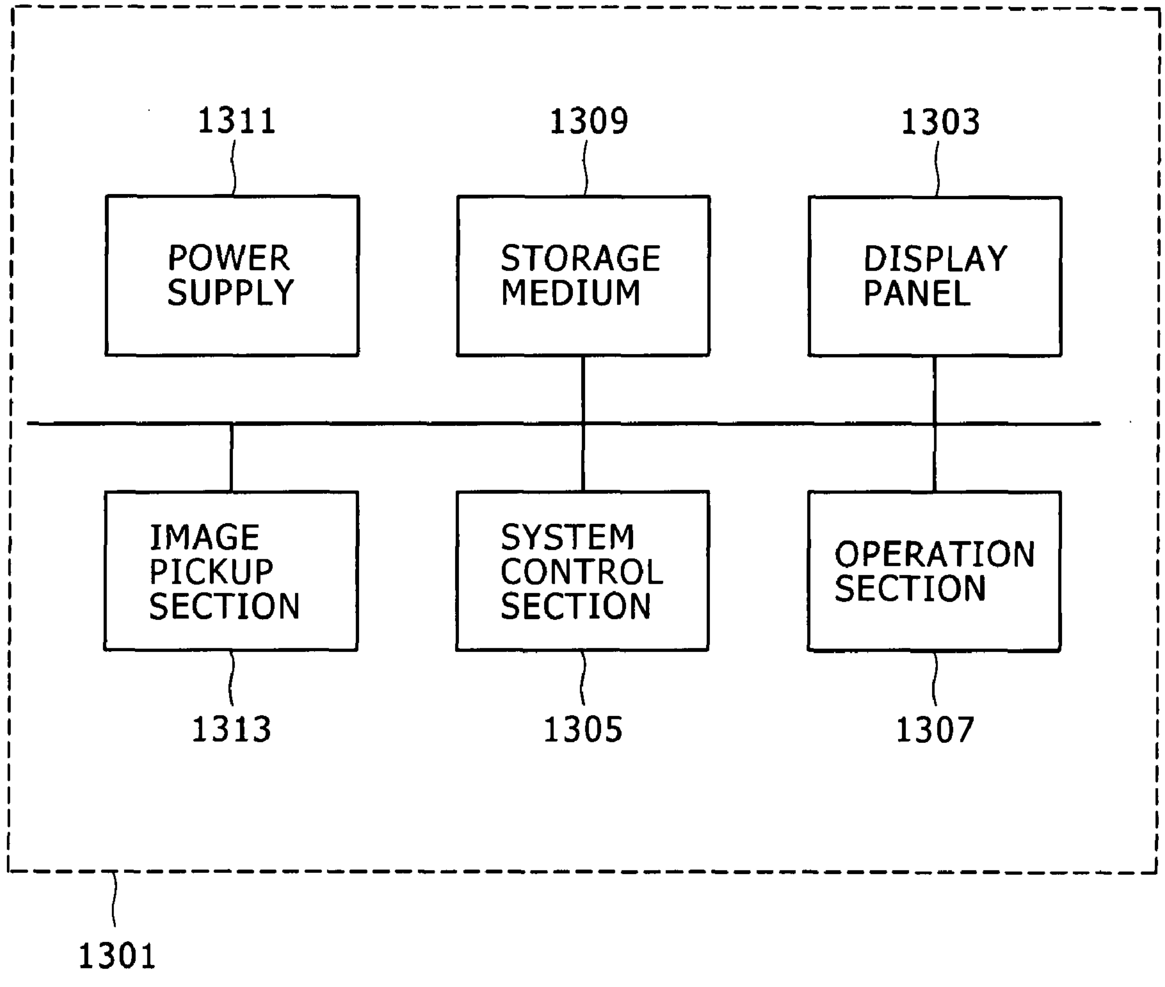
FIG. 34 shows exemplary implementation in an electronic device.

FIG. 34 shows an exemplary functional structure of an image pickup apparatus 1301. The image pickup apparatus 1301 contains, as primary components, a display panel 1303, a system control section 1305, an operation section 1307, a storage medium 1309, a power supply 1311, and an image pickup section 1313.

The system control section 1305 is formed by a microprocessor, for example. The system control section 1305 controls an overall system operation. The operation section 1307 may be a mechanical operation unit or a graphic user interface.

The storage medium 1309 is used as storage space for a data file corresponding to an image or video displayed on the display panel 1303, firmware, an application program, etc. In the case where the image pickup apparatus 1301 is of a portable type, a battery power supply is used as the power supply 1311. Needless to say, in the case where the image pickup apparatus 1301 is of a stationary type, the commercial power supply may be used.

The image pickup section 1313 is, for example, formed by a CMOS sensor and a signal processing section for processing a signal outputted from the CMOS sensor. The structure of this image pickup apparatus can be applied to a digital camera, a video camera, for example.

(c5) Information Processing Apparatus

The power consumption detection apparatus and the peak brightness control apparatus may be contained in a portable information processing apparatus.

Figure 35:
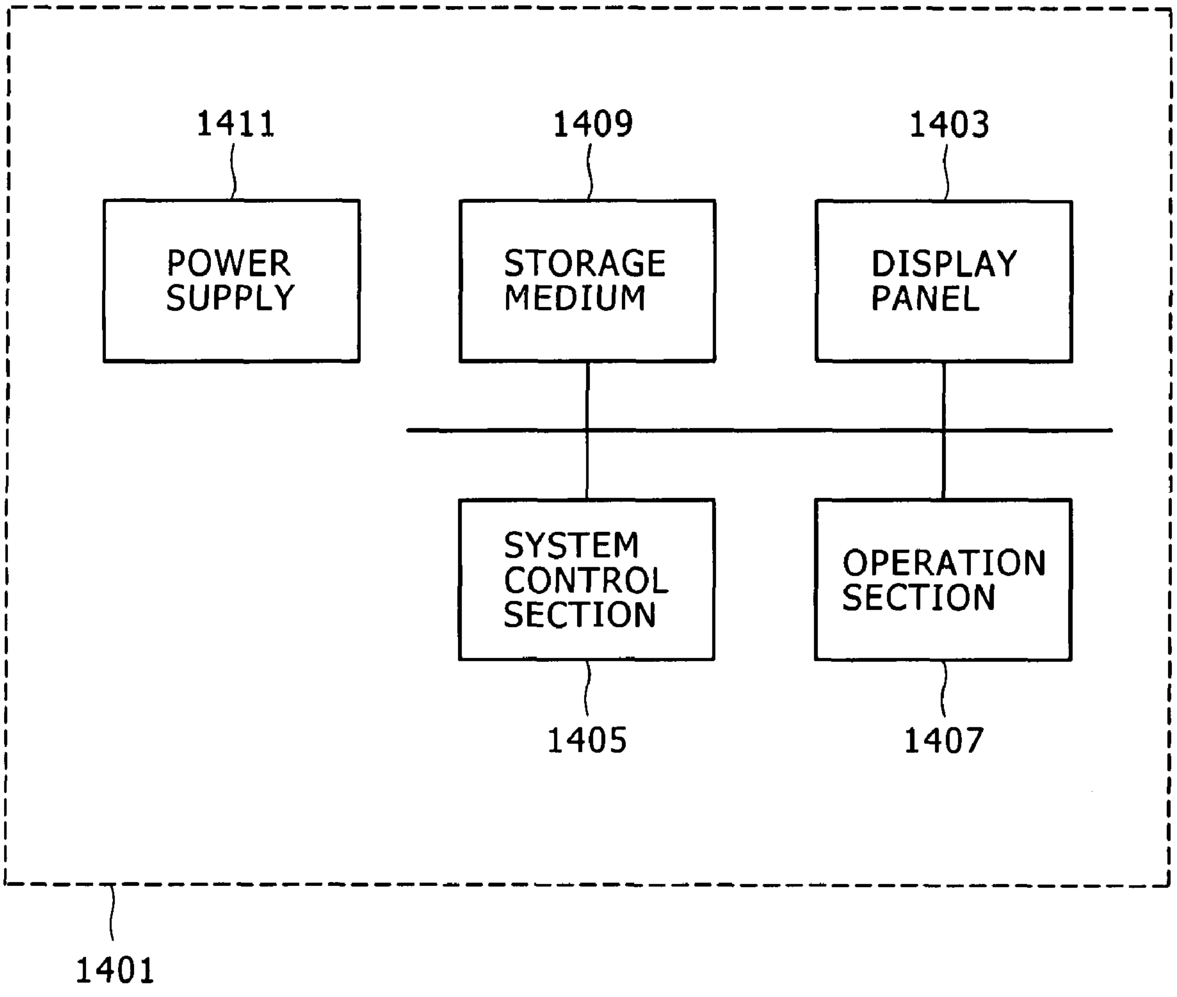
FIG. 35 shows exemplary implementation in an electronic device.

FIG. 35 shows an exemplary functional structure of a portable information processing apparatus 1401. The information processing apparatus 1401 contains, as primary components, a display panel 1403, a system control section 1405, an operation section 1407, a storage medium 1409, and a power supply 1411.

The system control section 1405 is formed by a microprocessor, for example. The system control section 1405 controls an overall system operation. The operation section 1407 may be a mechanical operation unit or a graphic user interface.

The storage medium 1409 is used as storage space for a data file corresponding to an image or video displayed on the display panel 1403, firmware, an application program, etc. In the case where the information processing apparatus 1401 is of a portable type, a battery power supply is used as the power supply 1411. Needless to say, in the case where the information processing apparatus 1401 is of a stationary type, the commercial power supply may be used.

The structure of this information processing apparatus can be applied to a game machine, an electronic book, an electronic dictionary, a computer, for example.

(H-2) Display Apparatus

In the above-described exemplary embodiment, the organic EL display panel has been described by way of example. However, this display control technique can also be widely applied to other self-luminous display apparatuses. For example, this display control technique can be applied to an inorganic EL display panel, an FED display panel, and so on.

(H-3) Duty Pulse

In the above-described exemplary embodiment, the duty pulse has been described as a signal for specifying the length of the illumination time within one horizontal line.

However, the duty pulse may be a signal for specifying the length of the illumination time within one frame.

(H-4) Computer Program

In the power consumption detection apparatus and the peak brightness control apparatus described in the above-described exemplary embodiment, the processing functions may all be implemented either in hardware or software, or alternatively, it may be so arranged that some of the processing functions are implemented in hardware and the others in software.

(H-5) Others

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:

a line current calculation section configured to calculate, based on an image signal, line current values respectively consumed by each of a plurality of horizontal lines in a display panel; and a power consumption calculation section configured to calculate, on a horizontal line cycle, power consumed by the display panel based on recent line current values corresponding in number to a vertical resolution of the display panel.

2. An image processing apparatus, comprising:

a current value conversion section configured to convert an image signal into pixel current values with respect to each of a plurality of pixels in a display panel;

a line current value computation section configured to sum the pixel current values that correspond in number to a horizontal resolution to obtain respective line current values consumed by corresponding horizontal lines in the display panel;

a line current value storage section configured to store recent line current values corresponding in number to a vertical resolution of the display panel;

a panel current value computation section configured to sum the recent line current values to obtain a panel current value consumed by the display panel; and a power consumption computation section configured to multiply the panel current value by a value of a power supply voltage of the display panel to obtain power consumption of the display panel on a horizontal line cycle.

3. An image processing apparatus, comprising:

a line current calculation section configured to calculate line current values consumed by each of a plurality of horizontal lines in a display panel based on image signals outputted to a self-luminous display apparatus that contains the display panel that has self-luminous elements and pixel circuits therefore arranged in a matrix, wherein the image signals are written in accordance with a line-sequential scanning system and are each retained in a corresponding one of the pixel circuits until a next writing time; and a power consumption calculation section configured to calculate, on a horizontal line cycle, power consumed by the display panel based on recent line current values corresponding in number to a vertical resolution of the display panel.

4. An image processing apparatus, comprising:

a line current calculation section configured to calculate, based on an image signal, line current values respectively consumed by each of a plurality of horizontal lines in a display panel;

a power consumption calculation section configured to calculate, on a horizontal line cycle, power consumed by the display panel based on recent line current values corresponding in number to a vertical resolution of the display panel; and a power consumption control section configured to control, on the horizontal line cycle, peak brightness of a display screen so that the consumed power calculated on the horizontal line cycle satisfies allowable power consumption.

5. The image processing apparatus according to claim 4, wherein said power consumption control section regulates a duty pulse width for controlling an illumination period within a horizontal scan period.

6. The image processing apparatus according to claim 4, wherein said power consumption control section regulates a value of a power supply voltage applied to the display panel.

7. An image processing apparatus, comprising:

a line current calculation section configured to calculate line current values consumed by each of a plurality of horizontal lines in a display panel based on image signals outputted to a self-luminous display apparatus that contains the display panel that has self-luminous elements and pixel circuits therefor arranged in a matrix, wherein the image signals are written in accordance with a line-sequential scanning system and are each retained in a corresponding one of the pixel circuits until a next writing time;

a power consumption calculation section configured to calculate, on a horizontal line cycle, power consumed by the display panel based on recent values of the line values corresponding in number to a vertical resolution of the display panel; and a power consumption control section configured to control, on the horizontal line cycle, peak brightness of a display screen so that the consumed power calculated on the horizontal line cycle satisfies allowable power consumption.

8. An image processing apparatus that executes a computer program stored on computer readable medium to perform operations comprising:

calculating, based on an image signal, line current values respectively consumed by each of a plurality of horizontal lines in a display panel;

calculating, on a horizontal line cycle, power consumed by the display panel based on recent line current values corresponding in number to a vertical resolution of the display panel; and controlling, on the horizontal line cycle, peak brightness of a display screen so that the consumed power calculated on the horizontal line cycle satisfies allowable power consumption.

* * * * *